United States Patent
Kim et al.

(10) Patent No.: US 10,681,694 B2
(45) Date of Patent: Jun. 9, 2020

(54) APPARATUS AND METHOD FOR PERFORMING RANDOM ACCESS PROCESS IN COMMUNICATION SYSTEM SUPPORTING BEAMFORMING SCHEME

(71) Applicant: Samsung Electronics Co., Ltd., Suwon-si, Gyeonggi-do (KR)

(72) Inventors: Jae-Won Kim, Seoul (KR); Hyun-Kyu Yu, Suwon-si (KR); Yong-Seok Kim, Suwon-si (KR); Beom-Sik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 15/775,297

(22) PCT Filed: Nov. 10, 2016

(86) PCT No.: PCT/KR2016/012901
§ 371 (c)(1),
(2) Date: May 10, 2018

(87) PCT Pub. No.: WO2017/082642
PCT Pub. Date: May 18, 2017

(65) Prior Publication Data
US 2018/0359746 A1    Dec. 13, 2018

(30) Foreign Application Priority Data

Nov. 12, 2015  (KR) .................. 10-2015-0158970

(51) Int. Cl.
*H04W 72/04*  (2009.01)
*H04B 7/0456*  (2017.01)
(Continued)

(52) U.S. Cl.
CPC ...... *H04W 72/0446* (2013.01); *H04B 7/0413* (2013.01); *H04B 7/0695* (2013.01);
(Continued)

(58) Field of Classification Search
CPC ........... H04W 72/0446; H04W 74/006; H04W 74/008; H04W 74/02; H04W 72/02;
(Continued)

(56) References Cited

U.S. PATENT DOCUMENTS

2006/0203789 A1\*  9/2006  Iacono ................. H04B 7/0608
                                                       370/338
2009/0203405 A1\*  8/2009  Horneman ........... H04B 7/0617
                                                       455/562.1
(Continued)

FOREIGN PATENT DOCUMENTS

KR  10-2014-0016854 A  2/2014
KR  10-2015-0077511 A  7/2015
(Continued)

*Primary Examiner* — Kiet Tang
(74) *Attorney, Agent, or Firm* — Jefferson IP Law, LLP

(57) ABSTRACT

The present invention relates to a $5^{th}$-generation (5G) or pre-5G communication system to be provided to support a higher data transmission rate beyond a $4^{th}$-generation (4G) communication system such as long term evolution (LTE). The present invention relates to a method for performing a random access process by a base station in a communication system supporting a beamforming scheme, the method comprising the steps of: transmitting information on a reception beam corresponding to each unit time interval; performing, in each unit time interval, a reception beam sweeping process on the basis of the reception beam corresponding to each unit time interval; stopping the reception beam sweeping process when, in the process of performing the reception beam sweeping process, it is detected that a random access process should be performed with a UE in a specific unit (Continued)

time interval; and performing the random access process with the UE.

19 Claims, 16 Drawing Sheets

(51) Int. Cl.
| | | |
|---|---|---|
| *H04B 7/06* | (2006.01) | |
| *H04B 7/08* | (2006.01) | |
| *H04W 16/28* | (2009.01) | |
| *H04W 72/02* | (2009.01) | |
| *H04B 7/0413* | (2017.01) | |
| *H04W 74/00* | (2009.01) | |
| *H04W 74/02* | (2009.01) | |
| *H04W 74/08* | (2009.01) | |
| *H04W 72/12* | (2009.01) | |
| *H04L 5/00* | (2006.01) | |

(52) U.S. Cl.
CPC ............ *H04B 7/088* (2013.01); *H04W 16/28* (2013.01); *H04W 72/02* (2013.01); *H04W 74/006* (2013.01); *H04W 74/008* (2013.01); *H04W 74/02* (2013.01); *H04L 5/0023* (2013.01); *H04L 5/0091* (2013.01); *H04W 72/1289* (2013.01); *H04W 74/0833* (2013.01)

(58) Field of Classification Search
CPC ......... H04W 72/1289; H04W 74/0833; H04W 16/28; H04B 7/0413; H04B 7/0695; H04B 7/088; H04L 5/0023; H04L 5/0091
See application file for complete search history.

(56) References Cited

U.S. PATENT DOCUMENTS

| | | | |
|---|---|---|---|
| 2013/0102345 A1* | 4/2013 | Jung | ................. H04B 7/0456 455/513 |
| 2013/0114487 A1* | 5/2013 | Kim | ................. H04W 72/042 370/311 |
| 2014/0029593 A1 | 1/2014 | Nandagopalan et al. | |
| 2014/0348051 A1 | 11/2014 | Park et al. | |
| 2015/0208443 A1 | 7/2015 | Jung et al. | |
| 2016/0006122 A1 | 1/2016 | Seol et al. | |
| 2016/0294462 A1 | 10/2016 | Jeong et al. | |

FOREIGN PATENT DOCUMENTS

| | | |
|---|---|---|
| WO | 2014/027868 A1 | 2/2014 |
| WO | 2014/139174 A1 | 9/2014 |

\* cited by examiner

APPARATUS AND METHOD FOR PERFORMING RANDOM ACCESS PROCESS IN COMMUNICATION SYSTEM SUPPORTING BEAMFORMING SCHEME

CROSS-REFERENCE TO RELATED APPLICATIONS

This application is a National Phase Entry of PCT International Application No. PCT/KR2016/012901, which was filed on Nov. 10, 2016, and claims priority to Korean Patent Application No. 10-2015-0158970, which was filed on Nov. 12, 2015, the contents of which are incorporated herein by reference.

TECHNICAL FIELD

The present disclosure relates to an apparatus and method for performing a random access process in a communication system supporting a beam-forming scheme, and more particularly, to an apparatus and method for performing a random access process based on a reception beam-sweeping process in a communication system supporting a beam-forming scheme.

BACKGROUND ART

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

Communication systems have been developed to support a higher data rate to meet ever-increasing demand for radio data traffic.

Meanwhile, communication systems proposed up to now have developed various schemes for mainly improving a spectral efficiency for increasing a data rate, however, it is difficult to satisfy explosive demand for radio data traffic with only the schemes for improving the spectral efficiency.

So, various schemes have been proposed for satisfying the explosive demand for the data traffic, and a typical one is a scheme of using a very wide frequency band, e.g., an mmWave frequency band.

It is very difficult to obtain a wide frequency band in a frequency band (<5 GHz) used in a current mobile communication cellular system, so there is a need for obtaining an mmWave frequency band in a frequency band higher than the frequency band used in the current mobile communication cellular system.

However, in a general wireless communication system, the higher a frequency band used for a wireless communication is, the more increased propagation path loss is. So, a propagation distance is relatively short due to increase of this propagation path loss, so it results in decrease of a service coverage. So, various schemes for solving a service coverage decrease problem due to increase of propagation path loss, that is, for mitigating propagation path loss and increasing a propagation distance have been proposed, and a typical one is a beam-forming scheme.

A scheduled access process in a communication system supporting a general beam-forming scheme will be described with reference to FIG. 1.

FIG. 1 schematically illustrates a scheduled access process in a communication system supporting a general beam-forming scheme.

Referring to FIG. 1, a scheduled access process denotes an access process for a base station to determine a location of a uplink resource, uplink resource amount, and a uplink transmission timing which are to be used for a user equipment (UE) to transmit data.

First, a UE 111 transmits uplink data to a base station (not shown in FIG. 1) based on resource allocation information related to a uplink resource allocated from the base station to the UE 111 and transmission timing information about a uplink transmission timing determined for the UE 111. This will be described below.

First, the UE 111 receives scheduling information from the base station through a physical downlink control channel (PDCCH). Here, the scheduling information includes resource allocation information related to a uplink resource allocated from the base station to the UE 111 and transmission timing information about a transmission timing determined for the UE 111.

After receiving the scheduling information, the UE 111 detects that there is a data packet to be transmitted at operation 113, and transmits a scheduling request (SR) packet to the base station at a corresponding timing through a corresponding resource based on the scheduling information received from the base station at operation 115. Here, the scheduling request packet is transmitted based on a corresponding beam at a corresponding location of a random access channel (RACH) allocated to the UE 111.

The UE 111 receives a scheduling grant and resource allocation information from the base station at operation 117. The UE 111 transmits the data packet to the base station through a physical uplink shared channel (PUSCH) corresponding to the resource allocation information at operation 119.

If the scheduled access scheme as described above is used, a base station may allocate a uplink resource which is optimal for a UE, so efficiency of a resource may be increased.

However, the scheduled access scheme has a requirement that the base station needs to exactly know buffer status and channel status for all UEs to which the base station provides a service. Here, the channel status at least includes beam-forming information.

Therefore, if the requirement is not satisfied, the scheduled access scheme may result in the following inefficiency.

(1) There is a probability that a uplink resource will be allocated to a UE which has no data to be transmitted, or a probability that more uplink resources than necessary will be allocated to a UE which has no data to be transmitted.

(2) There is a probability that a modulation and coding scheme (MCS)(or a beam resource) which is unsuitable for channel status of a corresponding UE will be allocated.

(3) Gain of a scheduling scheme among a plurality of UEs which is based on channel quality information may be decreased. Here, the scheduling scheme which is based on the channel quality information may be, for example, a proportional fair (PF) scheduling scheme.

Further, if the scheduled access scheme is applied to an mmWave communications system supporting a beam-forming scheme, the following situation may occur.

(1) First, in the mmWave communication system supporting the beam-forming scheme, a channel relatively fast changes and a beam dimension increases, so amount of feedback information increases and a feedback period may be shortened. This results in increase of control channel overhead and power consumption of a UE.

(2) If the mmWave communication system supporting the beam-forming scheme transmits a control packet of a relatively small size such as a buffer status report packet, system efficiency may be decreased, and this is a limitation of spatial domain multiplexing.

A scheduled access process in a communication system supporting a general beam-forming scheme has been described with reference to FIG. 1, and operating processes of a base station and UEs according to a scheduled access process in a communication system supporting a general beam-forming scheme will be described with reference to FIG. 2.

FIG. 2 schematically illustrates operating processes of a base station and UEs according to a scheduled access process in a communication system supporting a general beam-forming scheme.

Referring to FIG. 2, a base station 211 transmits scheduling information in a specific radio frame, e.g., the first radio frame among downlink radio frames at operation 217. Each of UEs which receives a service from the base station 211, e.g., a UE #1 213 and a UE #2 215 receives scheduling information transmitted by the base station 211, and transmits a scheduling request packet based on the scheduling information at operations 219 and 221. Here, a location of a resource in which each of the UE #1 213 and the UE #2 215 transmits the scheduling request packet, i.e., a location within an RACH is fixed.

The base station 211 determines a UE which the base station 211 will allocate a uplink resource based on the scheduling request packet received from each of the UE #1 213 and the UE #2 215, and allocates the uplink resource to the determined UE. In FIG. 2, it will be assumed that the base station 211 allocates the uplink resource to the UE #1 213. So, the base station 211 transmits scheduling information including information related to the uplink resource allocated to the UE #1 213 at operation 223. Upon receiving the scheduling information transmitted by the base station 211, the UE #1 213 transmits a data packet to the base station 211 through a corresponding uplink resource at a corresponding timing based on the received scheduling information at operation 225.

Upon detecting that data packet transmitting operation of the UE #1 213 is completed, the base station 211 allocates a uplink resource to the UE #2 215, and transmits scheduling information including information related to the uplink resource allocated to the UE #2 215 at operation 227. Upon receiving the scheduling information transmitted by the base station 211, the UE #2 215 transmits a data packet to the base station 211 through a corresponding uplink resource at a corresponding timing based on the received scheduling information at operation 229.

As described in FIG. 2, if the scheduled access process is used, delay time increases due to transmission/reception of a scheduling request packet, and/or the like, a UE needs to continuously monitor scheduling information transmitted from a base station, so consumed power thereof may be increased. Further, a retransmission operation for a corresponding packet may be inefficient. That is, a retransmission process such as a hybrid automatic repeat request (HARQ) process is required, a scheduling request packet transmitting/receiving operation is performed while the retransmission process is performed, so a buffer size as well as delay time increases.

Meanwhile, a random access process in a communication system supporting a general beam-forming scheme will be described below.

First, the random access process denotes an access process in which a UE which occupies a RACH based on a contention-based scheme transmits a data packet if there is data to be transmitted at a buffer included in the UE.

In the random access process, amount of buffer status report packets and channel status feedback information decreases, so resources used for data packet transmission/reception may increase, this results in increase of resource efficiency.

Even though the random access process needs to perform a beam-forming process for a corresponding beam, a UE which is located at a corresponding location may perform a random access process, so a base station may not know about that which UE will perform a random access process in advance.

Of course, if a base station performs an omni-directional beam search process, the base station may perform a random access process with the UE regardless of that the UE is located at which direction. However, for performing the omni-directional beam search process, the base station needs to use an omni-directional beam pattern, and use of the omni-directional beam pattern may decrease beam-forming gain. For example, if the omni-directional beam pattern is used, an arrival distance may be reduced to ¼ compared to a case that the omni-directional beam pattern is not used.

The above information is presented as background information only to assist with an understanding of the present disclosure. No determination has been made, and no assertion is made, as to whether any of the above might be applicable as prior art with regard to the present disclosure.

DETAILED DESCRIPTION OF THE INVENTION

Technical Problem

An embodiment of the present disclosure proposes an apparatus and method for performing a random access process in a communication system supporting a beam-forming scheme.

An embodiment of the present disclosure proposes an apparatus and method for performing a random access process based on a reception beam-sweeping process in a communication system supporting a beam-forming scheme.

An embodiment of the present disclosure proposes an apparatus and method for performing a random access process by considering a directional beam pattern in a communication system supporting a beam-forming scheme.

An embodiment of the present disclosure proposes an apparatus and method for performing a random access process by considering dual connectivity in a communication system supporting a beam-forming scheme.

Technical Solution

An embodiment of the present disclosure provides a method for performing a random access process by a base station in a communication system supporting a beam-forming scheme. The method includes transmitting information related to a reception beam which correspond to each unit time interval, performing a reception beam-sweeping process based on the reception beam which corresponds to the unit time interval in each unit time interval, stopping the reception beam-sweeping process upon detecting that a random access process needs to be performed with a user equipment (UE) in a specific unit time interval while performing the reception beam-sweeping process, and performing the random access process with the UE.

An embodiment of the present disclosure provides a method for performing a random access process by a user equipment (UE) in a communication system supporting a beam-forming scheme. The method includes receiving, from a base station, information related to a reception beam which correspond to each unit time interval, selecting an optimal beam based on the information related to the reception beam which correspond to each unit time interval, and performing a random access process with the base station in a unit time interval which corresponds to the optimal beam.

An embodiment of the present disclosure provides a base station in a communication system supporting a beam-forming scheme. The base station comprises a controller, and a transceiver configured to transmit information related to a reception beam which correspond to each unit time interval, to perform a reception beam-sweeping process based on the reception beam which corresponds to the unit time interval in each unit time interval, to stop the reception beam-sweeping process if the controller detects that a random access process needs to be performed with a user equipment (UE) in a specific unit time interval while performing the reception beam-sweeping process, and to perform a random access process with the UE.

An embodiment of the present disclosure provides a user equipment (UE) in a communication system supporting a beam-forming scheme. The UE comprises a transceiver; and a controller, wherein the transceiver is configured to perform an operation of receiving, from a base station, information related to a reception beam which correspond to each unit time interval, wherein the controller is configured to perform an operation of selecting an optimal beam based on the information related to the reception beam which correspond to each unit time interval, and wherein the transceiver is configured to perform an operation of performing a random access process with the base station in a unit time interval which corresponds to the optimal beam.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Advantageous Effects

An embodiment of the present disclosure enables to perform a random access process in a communication system supporting a beam-forming scheme.

An embodiment of the present disclosure enables to perform a random access process based on a reception beam-sweeping process in a communication system supporting a beam-forming scheme.

An embodiment of the present disclosure enables to perform a random access process by considering a directional beam pattern in a communication system supporting a beam-forming scheme.

An embodiment of the present disclosure enables to perform a random access process by considering dual connectivity in a communication system supporting a beam-forming scheme.

BRIEF DESCRIPTION OF DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

Figure 1:
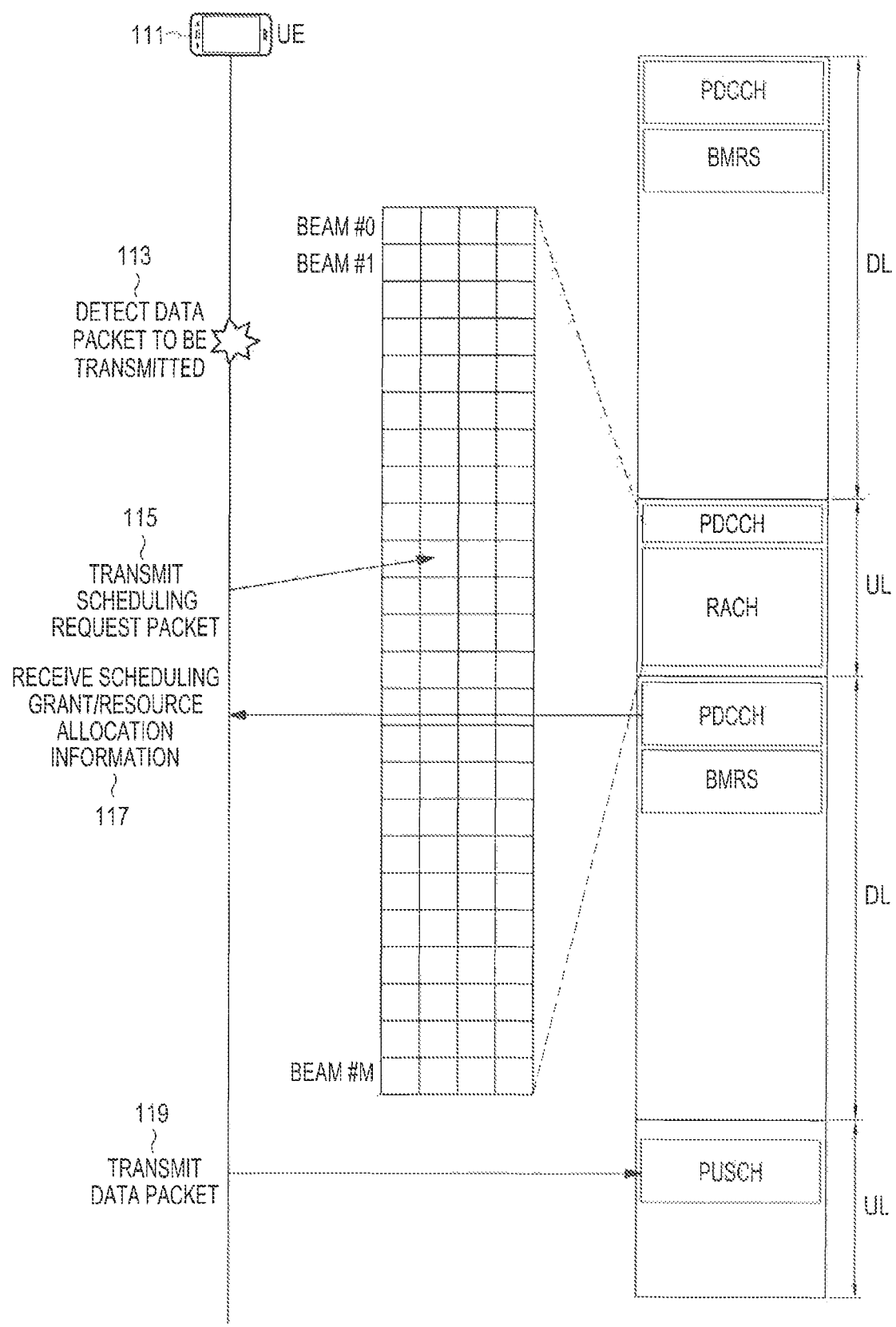
FIG. 1 schematically illustrates a scheduled access process in a communication system supporting a general beam-forming scheme.
Figure 2:
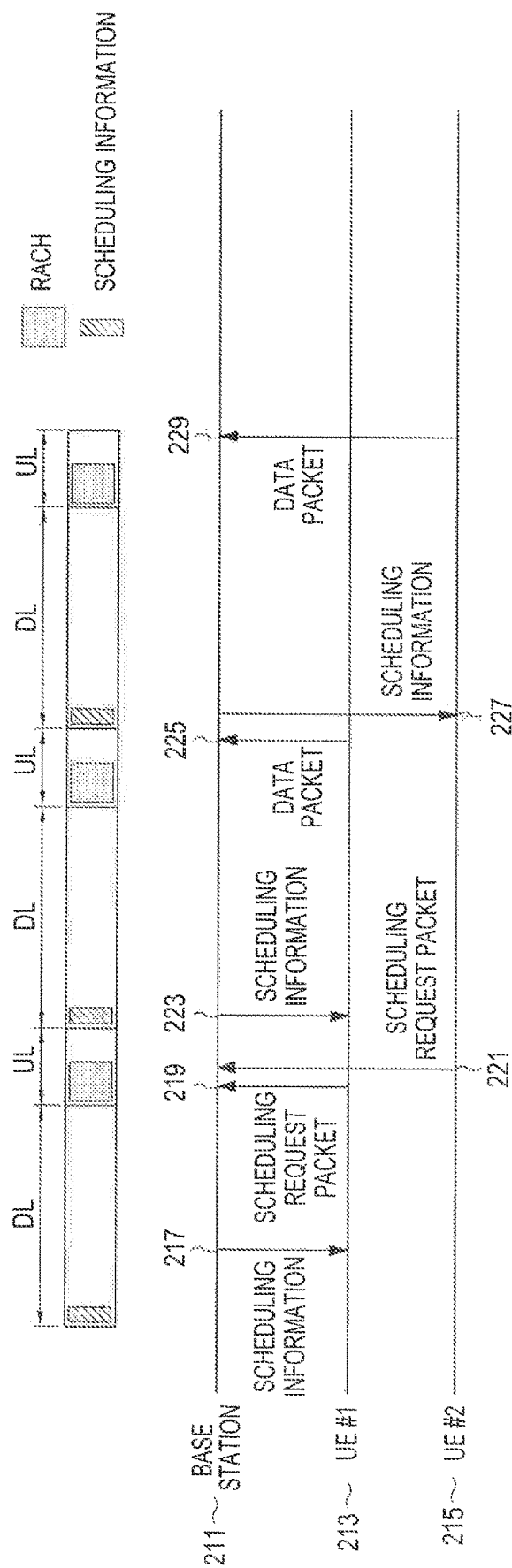
FIG. 2 schematically illustrates operating processes of a base station and UEs according to a scheduled access process in a communication system supporting a general beam-forming scheme.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a user equipment (UE) may be, for example, an electronic device. In various embodiments of the present disclosure, it will be noted that the term UE may be interchangeable with the terms terminal, wireless communication terminal, mobile station (MS), wireless terminal, mobile device, and/or the like.

According to various embodiments of the present disclosure, a UE may be, for example, a signal transmitting apparatus, or a signal receiving apparatus, and an evolved node B (eNB) may be, for example, a signal transmitting apparatus, or a signal receiving apparatus. In various embodiments of the present disclosure, it will be noted that the term eNB may be interchangeable with the terms access point (AP), base station (BS), and/or the like.

An embodiment of the present disclosure proposes an apparatus and method for performing a random access process in a communication system supporting a beam-forming scheme.

An embodiment of the present disclosure proposes an apparatus and method for performing a random access process based on a reception beam-sweeping process in a communication system supporting a beam-forming scheme.

An embodiment of the present disclosure proposes an apparatus and method for performing a random access process by considering a directional beam pattern in a communication system supporting a beam-forming scheme.

An embodiment of the present disclosure proposes an apparatus and method for performing a random access process by considering dual connectivity in a communication system supporting a beam-forming scheme.

An apparatus and method proposed in an embodiment of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3$^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16ad communication system, an IEEE 802.16m communication system, an IEEE 802.16e communication system, an evolved packet system (EPS), a mobile internet protocol (Mobile IP) system, and/or the like.

An example of a random access process in a communication system supporting a beam-forming scheme according to an embodiment of the present disclosure will be described with reference to FIG. 3.

Figure 3:
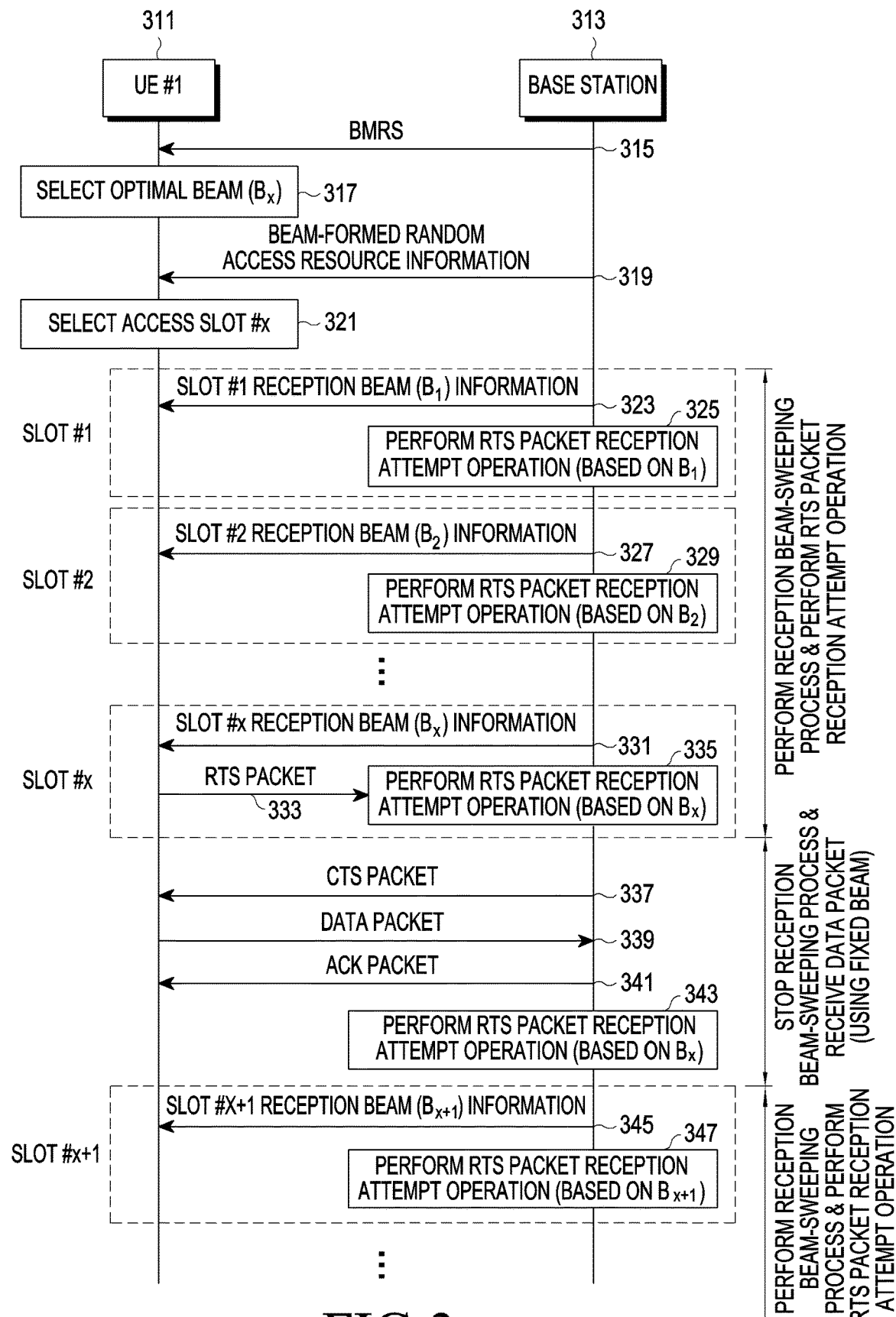
FIG. 3 schematically illustrates an example of a random access process in a communication system supporting a beam-forming scheme according to an embodiment of the present disclosure.

FIG. 3 schematically illustrates an example of a random access process in a communication system supporting a beam-forming scheme according to an embodiment of the present disclosure.

Referring to FIG. 3, the communication system supporting the beam-forming scheme includes a UE, e.g., UE #1 311 and a base station 313.

First, the base station 313 transmits a beam measurement reference signal (BMRS) as a reference signal used for beam measurement at operation 315. The BMRS may be implemented with various forms such as a beacon signal, and/or the like, and a detailed description thereof will be omitted herein.

The UE #1 311 receives the BMRS, and selects a beam which is optimal for the UE #1 311, i.e., an optimal beam based on the received BMRS at operation 317. In FIG. 3, it will be assumed that the UE #1 311 selects $B_X$ as the optimal beam.

Meanwhile, the base station 313 transmits beam-formed random access resource information at operation 319. Here, the beam-formed random access resource information includes interval information, i.e., information about a beam-formed random access interval within a specific subframe, and the interval information includes information related to a start timing and an end timing of the beam-formed random access interval, information related to the number of slots included in the beam-formed random access interval and a length per slot, and information related to a beam allocated per each slot. The beam-formed random access resource information may be transmitted with a static or semi-static scheme, e.g., through system information, or with a dynamic scheme, e.g., through a control message.

The UE #1 311 receives the beam-formed random access resource information, and selects an access slot which corresponds to the selected optimal beam $B_X$, e.g., access slot # x at operation 321.

Thereafter, the base station 313 transmits reception beam information per slot, and performs a ready to send (RTS) packet reception attempt operation for receiving an RTS packet from the UE #1 311. Here, the RTS packet is a packet indicating that the UE #1 311 is scheduled to transmit a data packet to the base station 313. Here, the reception beam information per slot represents information about a beam which the base station 313 receives in each slot, and the RTS packet reception attempt operation denotes an operation in which the base station 313 attempts to receive the RTS packet from the UE #1 311 in a corresponding slot. In an embodiment of the present disclosure, the random access process has been described with reference to, for example, a case that the UE #1 311 transmits the RTS packet, however, the UE #1 311 may perform the random access process using other packets, other signals, or other messages as well as the RTS packet.

The operation of transmitting reception beam information per slot and the RTS packet reception attempt operation in the base station 313 will be described below.

First, the base station 313 transmits slot #1-reception beam information in a slot #1 at operation 323. Here, the slot #1-reception beam information includes a beam index which corresponds to beam $B_1$ and, for convenience, it will be assumed that $B_1$ is a beam index corresponding to the beam $B_1$.

After transmitting the slot #1-reception beam information, the base station 313 performs an RTS packet reception attempt operation of attempting to receive an RTS packet from the UE #1 311 based on the beam $B_1$ at operation 325.

After completing the RTS packet reception attempt operation which is based on the beam $B_1$, the base station 313 transmits slot #2-reception beam information in a slot #2 if the RTS packet is not received from the UE #1 311 at operation 327. Here, the slot #2-reception beam information includes a beam index which corresponds to beam $B_2$, i.e., $B_2$.

After transmitting the slot #2-reception beam information, the base station 313 performs an RTS packet reception attempt operation of attempting to receive an RTS packet from the UE #1 311 based on the beam $B_2$ at operation 329.

After completing the RTS packet reception attempt operation which is based on the beam $B_2$, the base station 313 transmits reception beam information for each of remaining slots in sequence if the RTS packet is not received from the UE #1 311, and performs an RTS packet reception attempt operation of attempting to receive an RTS packet from the UE #1 311.

While transmitting reception beam information per slot and performing an RTS packet reception attempt operation in this way, the base station 313 transmits slot # x-reception beam information in a slot # x at operation 331. Here, the slot # x-reception beam information includes a beam index which corresponds to beam $B_x$, i.e., $B_x$.

After receiving the slot # x-reception beam information, the UE #1 311 transmits an RTS packet using a resource which is allocated to the UE #1 311 in advance, e.g., a multiple access (MA) resource$_{1,1}$ at operation 333. Here, the MA resource may be, for example, a resource block, and the resource block has the same structure as a resource block supported in an LTE orthogonal frequency division multiplexing (OFDM) system. For example, the resource block may be defined as an index in a frequency axis and a time axis as in a resource block structure supported by the LTE OFDM system, and a detailed description will be omitted herein. After transmitting the slot # x-reception beam information, the base station 313 performs an RTS packet reception attempt operation of attempting to receive an RTS packet from the UE #1 311 based on the beam $B_x$ at operation 335.

After completing the RTS packet reception attempt operation which is based on the beam $B_x$, the base station 313 receives the RTS packet from the UE #1 311. As the RTS packet is received from the UE #1 311, the base station 313 does not perform a reception beam-sweeping process any more, and receives data from the UE #1 311.

Upon receiving the RTS packet from the UE #1 311, the base station 313 transmits a clear to send (CTS) packet to the UE #1 311 at operation 337. Here, the CTS packet is a packet indicating that the base station 313 allows the UE #1 311 to transmit a data packet to the base station 313. In an embodiment of the present disclosure, a random access process has been described with reference to, for example, a case that the base station 313 transmits the CTS packet, however, the base station 313 may perform the random access process using other packets, other signals, or other messages as well as the CTS packet.

After receiving the CTS packet from the base station 313, the UE #1 311 transmits a data packet to the base station 313 at operation 339. After receiving the data packet from the UE #1 311, the base station 313 an acknowledgement (ACK) packet indicating that the base station 313 has normally received the data packet at operation 341. Like this, the reception beam-sweeping process of the base station 313 is not performed while an RTS packet transmitting/receiving operation, a CTS packet transmitting/receiving operation, a data packet transmitting/receiving operation, and an ACK packet transmitting/receiving operation are performed between the UE #1 311 and the base station 313.

After transmitting the ACK packet, the base station 313 performs the RTS packet reception attempt operation which is based on the beam $B_x$ at operation 343. After performing the RTS packet reception attempt operation, the base station 313 transmits slot # x+1-reception beam information in slot # x+1 if the RTS packet is not received from the UE #1 311 at operation 345. Here, the slot # x+1-reception beam information includes a beam index which corresponds to beam $B_{x+1}$, i.e., $B_{x+1}$. After transmitting the slot # x+1-reception beam information, the base station 313 performs an RTS packet reception attempt operation of attempting to receive an RTS packet from the UE #1 311 based on the beam $B_{x+1}$ at operation 347. Subsequent operations are similar to the operations as described above, and a detailed description will be omitted herein.

As described above, the base station 313 sequentially performs a reception beam-sweeping process per slot, and stops performing the reception beam-sweeping process when performing a data receiving operation with the UE #1 311 while performing the reception beam-sweeping process. When the data receiving operation with the UE #1 311 is completed, the base station 313 performs the reception beam-sweeping process again. That is, the base station 313 statically uses a reception beam for the UE #1 311 upon performing a data transmitting/receiving operation with the UE #1 311, so the base station 313 does not the reception beam-sweeping process.

Although FIG. 3 illustrates an example of a random access process in a communication system supporting a beam-forming scheme according to an embodiment of the present disclosure, various changes could be made to FIG. 3. For example, although shown as a series of operations, various operations in FIG. 3 could overlap, occur in parallel, occur in a different order, or occur multiple times.

Figure 4:
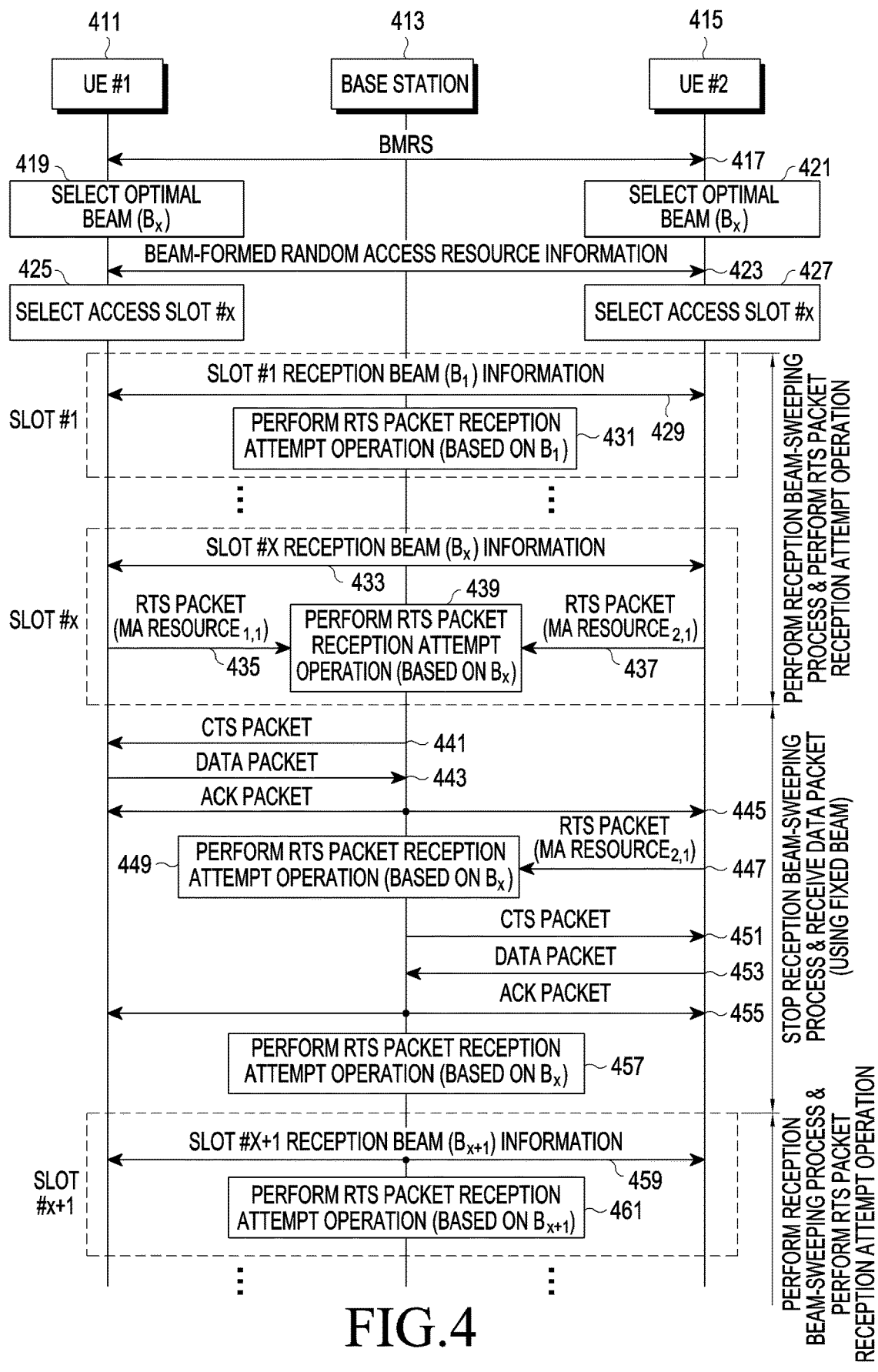
FIG. 4 schematically illustrates another example of a random access process in a communication system supporting a beam-forming scheme according to an embodiment of the present disclosure.

An example of a random access process in a communication system supporting a beam-forming scheme according to an embodiment of the present disclosure has been described with reference to FIG. 3, and another example of a random access process in a communication system supporting a beam-forming scheme according to an embodiment of the present disclosure will be described with reference to FIG. 4. FIG. 4 schematically illustrates another example of a random access process in a communication system supporting a beam-forming scheme according to an embodiment of the present disclosure.

Referring to FIG. 4, the communication system supporting the beam-forming scheme includes UEs, e.g., UE #1 411 and UE #2 415, and a base station 413.

First, the base station 413 transmits a BMRS as a reference signal used for beam measurement at operation 417. The BMRS may be implemented with various forms, and a detailed description will be omitted herein.

The UE #1 411 receives the BMRS, and selects an optimal beam which is optimal for the UE #1 411 at operation 419 based on the received BMRS. In FIG. 4, it will be assumed that the UE #1 411 selects $B_x$ as the optimal beam.

Further, the UE #2 415 receives the BMRS, and selects an optimal beam which is optimal for the UE #2 415 at operation 421. In FIG. 4, it will be assumed that the UE #2 415 selects the $B_X$ as the optimal beam. That is, a case that the UE #1 411 and the UE #2 415 select the same beam as an optimal beam is shown in FIG. 4.

Meanwhile, the base station 413 transmits beam-formed random access resource information at operation 423. Here, the beam-formed random access resource information includes interval information, i.e., information about a beam-formed random access interval within a specific subframe, and the interval information includes information related to a start timing and an end timing of the beam-formed random access interval, information related to the number of slots included in the beam-formed random access interval and a length per slot, and information related to a beam allocated per each slot. The beam-formed random access resource information may be transmitted with a static or semi-static scheme, e.g., through system information, or with a dynamic scheme, e.g., through a control message.

The UE #1 411 receives the beam-formed random access resource information, and selects an access slot which corresponds to the selected optimal beam $B_X$, e.g., access slot # x at operation 425.

The UE #2 415 receives the beam-formed random access resource information, and selects an access slot which corresponds to the selected optimal beam $B_X$, e.g., the access slot # x at operation 427.

Thereafter, the base station 413 transmits reception beam information per slot, and performs an RTS packet reception attempt operation for receiving an RTS packet from the UE #1 411 and the UE #2 415. Here, the reception beam information per slot represents information about a beam which the base station 413 receives in each slot, and the RTS packet reception attempt operation denotes an operation in which the base station 413 attempts to receive the RTS packet from the UE #1 411 and the UE #2 415 in a corresponding slot. In an embodiment of the present disclosure, the random access process has been described with reference to, for example, a case that the UE #1 411 and the UE #2 415 transmit the RTS packet, however, the UE #1 411 and the UE #2 415 may perform the random access process using other packets, other signals, or other messages as well as the RTS packet.

The operation of transmitting reception beam information per slot and the RTS packet reception attempt operation in the base station 413 will be described below.

First, the base station 413 transmits slot #1-reception beam information in a slot #1 at operation 429. Here, the slot #1-reception beam information includes a beam index which corresponds to beam $B_1$, i.e., $B_1$.

After transmitting the slot #1-reception beam information, the base station 413 performs an RTS packet reception attempt operation of attempting to receive an RTS packet from the UE #1 411 and the UE #2 415 based on the beam $B_1$ at operation 431.

While transmitting reception beam information per slot and performing an RTS packet reception attempt operation in this way, the base station 413 transmits slot # x-reception beam information in a slot # x at operation 433. Here, the slot # x-reception beam information includes a beam index which corresponds to beam $B_X$, i.e., $B_X$.

After receiving the slot # x-reception beam information, the UE #1 411 transmits an RTS packet using a resource which is allocated to the UE #1 411 in advance, e.g., a MA resource$_{1,1}$ at operation 435.

After receiving the slot # x-reception beam information, the UE #2 415 transmits an RTS packet using a resource which is allocated to the UE #2 415 in advance, e.g., a MA resource$_{2,1}$ at operation 437.

After transmitting the slot # x-reception beam information, the base station 313 performs an RTS packet reception attempt operation of attempting to receive an RTS packet from the UE #1 411 and the UE #2 415 based on the beam $B_X$ at operation 439.

After completing the RTS packet reception attempt operation which is based on the beam $B_X$, the base station 413 receives the RTS packet from the UE #1 411 and the UE #2 415. As the RTS packet is received from the UE #1 411 and the UE #2 415, the base station 413 does not perform a reception beam-sweeping process any more, and receives data from the UE #1 411 and the UE #2 415.

Upon receiving the RTS packet from the UE #1 411, the base station 413 transmits a CTS packet to the UE #1 411 at operation 441. In an embodiment of the present disclosure, a random access process has been described with reference to, for example, a case that the base station 413 transmits the CTS packet, however, the base station 413 may perform the random access process using other packets, other signals, or other messages as well as the CTS packet. After receiving the CTS packet from the base station 413, the UE #1 411 transmits a data packet to the base station 413 at operation 443. After receiving the data packet from the UE #1 411, the base station 413 an ACK packet indicating that the base station 413 has normally received the data packet at operation 445. Like this, the reception beam-sweeping process of the base station 413 is not performed while an RTS packet transmitting/receiving operation, a CTS packet transmitting/receiving operation, a data packet transmitting/receiving operation, and an ACK packet transmitting/receiving operation are performed between the UE #1 411 and the base station 413.

After receiving the slot # x-reception beam information, the UE #2 415 transmits an RTS packet using a resource which is allocated to the UE #2 415 in advance, e.g., a MA resource$_{2,1}$ at operation 447.

The base station 413 performs an RTS packet reception attempt operation of attempting to receive an RTS packet from the UE #1 411 and the UE #2 415 based on the beam $B_X$ at operation 449.

After completing the RTS packet reception attempt operation which is based on the beam $B_X$ the base station 413 receives the RTS packet from the UE #2 415. As the RTS packet is received from the UE #2 415, the base station 413 does not perform a reception beam-sweeping process any more, and receives a data packet from the UE #2 415.

Upon receiving the RTS packet from the UE #2 415, the base station 413 transmits a CTS packet to the UE #2 415 at operation 451. In an embodiment of the present disclosure, a random access process has been described with reference to, for example, a case that the base station 413 transmits the CTS packet, however, the base station 413 may perform the random access process using other packets, other signals, or other messages as well as the CTS packet.

After receiving the CTS packet from the base station 413, the UE #2 415 transmits a data packet to the base station 413 at operation 453. After receiving the data packet from the UE #2 415, the base station 413 an ACK packet indicating that the base station 413 has normally received the data packet at operation 455. Like this, the reception beam-sweeping process of the base station 413 is not performed while an RTS packet transmitting/receiving operation, a CTS packet transmitting/receiving operation, a data packet transmitting/receiving operation, and an ACK packet transmitting/receiving operation are performed between the UE #2 415 and the base station 413.

The base station 413 performs the RTS packet reception attempt operation which is based on the beam $B_x$ again at operation 457. After performing the RTS packet reception attempt operation, the base station 413 transmits slot # x+1-reception beam information in slot # x+1 if the RTS packet is not received from the UE #1 411 and the UE #2 415 at operation 459. Here, the slot # x+1-reception beam information includes a beam index which corresponds to beam $B_{x+1}$, i.e., $B_{x+1}$.

After transmitting the slot # x+1-reception beam information, the base station 413 performs an RTS packet reception attempt operation of attempting to receive an RTS packet from the UE #1 411 and the UE #2 415 based on the beam $B_{x+1}$ at operation 461. Subsequent operations are similar to the operations as described above, and a detailed description will be omitted herein.

As described above, the base station 413 sequentially performs a reception beam-sweeping process per slot, and stops performing the reception beam-sweeping process when performing a data packet transmitting/receiving operation with the UE #1 411 or the UE #2 415 while performing the reception beam-sweeping process.

When the data packet transmitting/receiving operation with the UE #1 411 or the UE #2 415 is completed, the base station 413 performs the reception beam-sweeping process again. That is, the base station 413 statically uses a reception beam for the UE #1 411 or the UE #2 415 upon performing the data packet transmitting/receiving operation with the UE #1 411 or the UE #2 415, so the base station 413 does not the reception beam-sweeping process.

Although FIG. 4 illustrates another example of a random access process in a communication system supporting a beam-forming scheme according to an embodiment of the present disclosure, various changes could be made to FIG. 4. For example, although shown as a series of operations, various operations in FIG. 4 could overlap, occur in parallel, occur in a different order, or occur multiple times.

Another example of a random access process in a communication system supporting a beam-forming scheme according to an embodiment of the present disclosure has been described with reference to FIG. 4, and an MA resource optimizing process in a communication system supporting a beam-forming scheme according to an embodiment of the present disclosure will be described with reference to FIG. 5.

Figure 5:
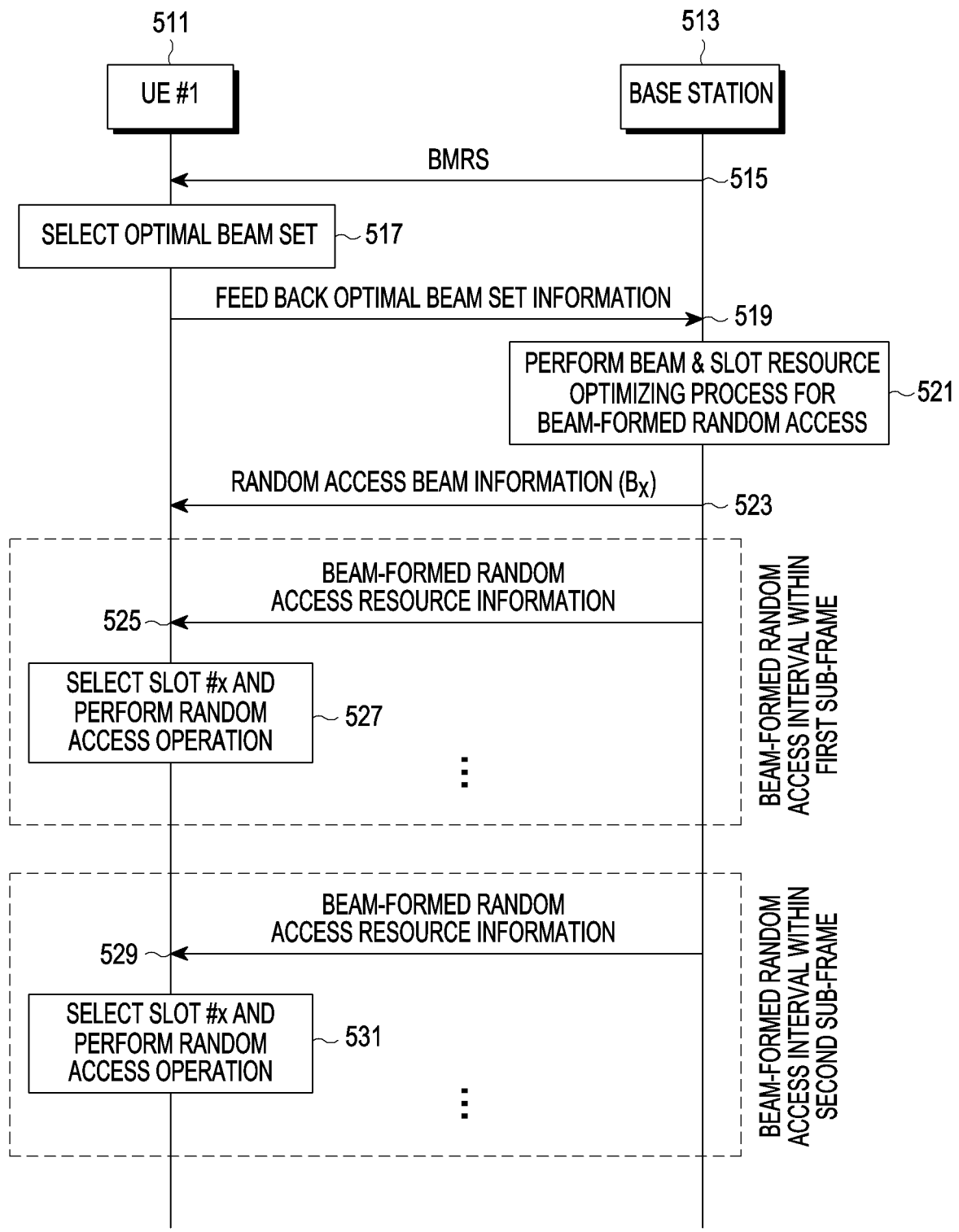
FIG. 5 schematically illustrates an MA resource optimizing process in a communication system supporting a beam-forming scheme according to an embodiment of the present disclosure.

FIG. 5 schematically illustrates an MA resource optimizing process in a communication system supporting a beam-forming scheme according to an embodiment of the present disclosure.

Referring to FIG. 5, the communication system includes UE #1 511 and a base station 513.

The base station 513 transmits a BMRS as a reference signal used for beam measurement at operation 515. The UE #1 511 receives the BMRS transmitted by the base station 513, and selects an optimal beam set based on the received BMRS at operation 517. The UE #1 511 detects beam indexes which may guarantee channel quality greater than or equal to preset threshold channel quality, and the optimal beam set includes the beam indexes which may guarantee the channel quality greater than or equal to the threshold channel quality.

Here, the channel quality may be expressed using, for example, various metrics such as a signal to interference and noise ratio (SINR), received signal code power (RSCP), reference signal received power (RSRP), a reference signal strength indicator (RSSI), reference signal received quality (RSRQ), a carrier-to-interference noise ratio (CINR), a signal-to-noise ratio (SNR), a block error rate (BLER), and/or the like, and a detailed description thereof will be omitted herein.

After selecting the optimal beam set, the UE #1 511 feeds back optimal beam set information including information about the optimal beam set to the base station 513 at operation 519. After receiving the optimal beam set information from the UE #1 511, the base station 513 performs an optimal process for a beam and a slot resource for a beam-formed random access, i.e., a beam & slot resource optimizing process for beam-formed random access at operation 521. Here, the beam & slot resource optimizing process for beam-formed random access will be described below.

First, the base station 513 allocates one of the beam indexes including in the optimal beam set to the UE #1 511. The base station 513 adjusts a beam to be allocated to UEs to which the base station 513 provides a service such that UEs may be uniformly distributed per beam index.

Meanwhile, the base station 513 may allocate a plurality of slots to one beam. Upon allocating the plurality of slots to the one beam, the base station 513 may additionally transmit information about that a corresponding UE needs to perform an access operation in which one among the plurality of slots to the corresponding UE, this will be described below, so a detailed description thereof will be omitted herein.

After performing the beam & slot resource optimizing process for beam-formed random access, the base station 513 transmits random access beam information to the UE #1 511 at operation 523. Here, the operation of transmitting the random access beam information will be described below.

The base station 513 allocates a beam to each UE at operation 521, so the base station 513 transmits, to the UE #1 511, random access beam information including a beam index which corresponds to the beam allocated to the UE #1 511. In FIG. 5, it will be assumed that the base station 513 allocates a beam $B_x$ as a beam for the UE #1 511, so the random access beam information transmitted to the UE #1 511 includes a beam index which corresponds to the beam $B_x$, i.e., $B_x$.

As described at operation 521, the plurality of slots may be allocated to one beam, in this case, the base station 513 may additionally include information about that a corresponding UE needs to perform a random access operation in which one among the plurality of slots into the random access beam information.

The base station 513 may allocate a logical ID to each UE for decreasing UE identifier (ID) information which UEs will include into an RTS packet. For example, the UE ID may be implemented with 32 bits, however, the logical ID may be implemented with 4 bits, so information included in the RTS packet may be decreased if the logical ID is allocated to the UEs.

After transmitting the random access beam information, the base station 513 transmits beam-formed random access resource information to the UE #1 511 at operation 525. Here, the beam-formed random access resource information includes interval information, i.e., information about a beam-formed random access interval within a specific subframe, and the interval information includes information related to a start timing and an end timing of the beam-formed random access interval, information related to the number of slots included in the beam-formed random access interval and a length per slot, and information related to a beam allocated per each slot. The beam-formed random access resource information may be transmitted with a static or semi-static scheme, e.g., through system information, or with a dynamic scheme, e.g., through a control message.

After receiving the beam-formed random access resource information from the base station 513, the UE #1 511 selects slot # x which corresponds to a beam $B_x$, and performs a random access operation which corresponds to this at operation 527. That is, operations 525 and 527 correspond to a beam-formed random access interval within the first sub-frame.

After the first sub-frame elapses, the base station 513 transmits beam-formed random access resource information to the UE #1 511 in the second sub-frame at operation 529. The beam-formed random access resource information has been described at operation 525, and a detailed description thereof will be omitted herein.

After receiving the beam-formed random access resource information from the base station 513, the UE #1 511 selects the slot # x which corresponds to the beam $B_x$, and performs a random access operation which corresponds to this at operation 531. That is, operations 529 and 531 correspond to a beam-formed random access interval within the second sub-frame.

Although FIG. 5 illustrates an MA resource optimizing process in a communication system supporting a beam-forming scheme according to an embodiment of the present disclosure, various changes could be made to FIG. 5. For example, although shown as a series of operations, various operations in FIG. 5 could overlap, occur in parallel, occur in a different order, or occur multiple times.

An MA resource optimizing process in a communication system supporting a beam-forming scheme according to an embodiment of the present disclosure has been described with reference to FIG. 5, and still another example of a random access process in a communication system supporting a beam-forming scheme according to an embodiment of the present disclosure will be described with reference to FIG. 6.

Figure 6:
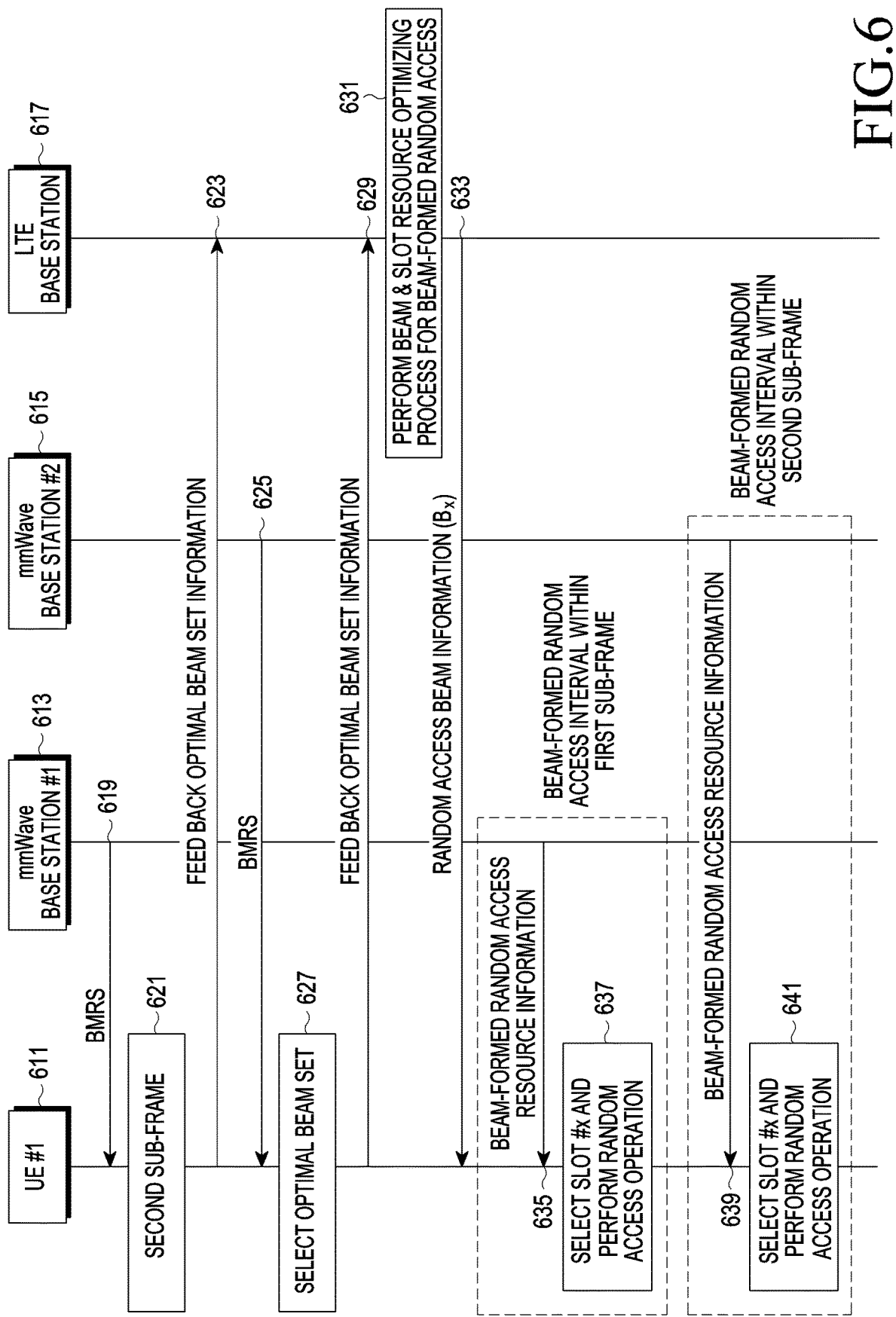
FIG. 6 schematically illustrates still another example of a random access process in a communication system supporting a beam-forming scheme according to an embodiment of the present disclosure.

FIG. 6 schematically illustrates still another example of a random access process in a communication system supporting a beam-forming scheme according to an embodiment of the present disclosure.

Referring to FIG. 6, it will be noted that a random access process in FIG. 6 is a random access process in a case of considering dual connectivity.

First, the communication system includes UE #1 611, mmWave base station #1 613, mmWave base station #2 615, and an LTE base station 617.

The mmWave base station #1 613 transmits a BMRS as a reference signal used for beam measurement at operation 619. The UE #1 611 receives the BMRS transmitted by the mmWave base station #1 613, and selects an optimal beam set based on the received BMRS at operation 621. The UE #1 611 detects beam indexes which may guarantee channel quality greater than or equal to preset threshold channel quality, and the optimal beam set includes the beam indexes which may guarantee the channel quality greater than or equal to the threshold channel quality. Here, channel quality has been described with reference to FIG. 5, and a detailed description thereof will be omitted herein.

After selecting the optimal beam set, the UE #1 611 feeds back optimal beam set information including information about the optimal beam set to the LTE base station 617 at operation 623. Here, the optimal beam set information is optimal beam set information per mmWave, and the optimal beam set information fed back at operation 623 includes optimal beam set information for the mmWave base station #1 613.

The mmWave base station #2 615 transmits a BMRS as a reference signal used for beam measurement at operation 625. The UE #1 611 receives the BMRS transmitted by the mmWave base station #2 615, and selects an optimal beam set based on the received BMRS at operation 627. The UE #1 611 detects beam indexes which may guarantee channel quality greater than or equal to preset threshold channel quality, and the optimal beam set includes the beam indexes which may guarantee the channel quality greater than or equal to the threshold channel quality.

After selecting the optimal beam set, the UE #1 611 feeds back optimal beam set information including information about the optimal beam set to the LTE base station 617 at operation 629. Here, the optimal beam set information is optimal beam set information per mmWave, and the optimal beam set information fed back at operation 629 includes optimal beam set information for the mmWave base station #2 615.

After receiving the optimal beam set information from the UE #1 611, the LTE base station 617 performs an optimal process for a beam and a slot resource for a beam-formed random access, i.e., a beam & slot resource optimizing process for beam-formed random access at operation 631. Here, the beam & slot resource optimizing process for beam-formed random access will be described below.

The LTE base station 617 performs a beam-formed random access-resource allocating process based on the optimal beam set information per mmWave base station received from the UE #1 611. That, the LTE base station 617 performs the beam-formed random access-resource allocating process based on the optimal beam set information for the mmWave base station #1 613 and the optimal beam set information for the mmWave base station #2 615 received from the UE #1 611.

The LTE base station 617 may allocate a beam and a slot resource to one mmWave base station, or may allocate a beam and a slot resource to each of two or more mmWave base stations. The reason why the LTE base station 617 allocates the beam and the slot resource to each of the two or more mmWave base stations will be described below.

The First reason is that the LTE base station 617 performs a data transmitting/receiving operation with the UE #1 611 through a remaining mmWave base station except for an mmWave base station which is impossible to communicate with the UE #1 611 among the two or more mmWave base stations if a communication between one of the two or more mmWave base stations and the UE #1 611 becomes impossible due to a rapid change in a channel environment.

The second reason is that the LTE base station 617 selects an mmWave base station which is more suitable for the UE #1 611 based on mobility, a location, a quality of service (QoS), and/or the like of the UE #1 611.

After performing the beam & slot resource optimizing process for beam-formed random access, the LTE base station 617 transmits random access beam information to the UE #1 611 at operation 633. Here, the operation of transmitting the random access beam information will be described below.

The LTE base station 617 allocates a beam to the UE #1 611 at operation 633, so the LTE base station 617 transmits, to the UE #1 611, random access beam information including a beam index which corresponds to the beam allocated to the UE #1 611. In FIG. 6, it will be assumed that the LTE base station 617 allocates a beam $B_x$ as a beam for the UE

1 611, so the random access beam information transmitted to the UE #1 611 includes a beam index which corresponds to the beam $B_x$, i.e., $B_x$.

Meanwhile, a plurality of slots may be allocated to one beam, in this case, the LTE base station 617 may additionally include information about that a corresponding UE needs to perform a random access operation in which one among the plurality of slots into the random access beam information.

The LTE base station 617 may allocate a logical ID to each UE for decreasing UE ID information which UEs will include into an RTS packet. For example, the UE ID may be implemented with 32 bits, however, the logical ID may be implemented with 4 bits, so information included in the RTS packet may be decreased if the logical ID is allocated to the UEs.

Meanwhile, the mmWave base station #1 613 transmits beam-formed random access resource information to the UE #1 611 at operation 635. Here, the beam-formed random access resource information includes interval information, i.e., information about a beam-formed random access interval within a specific sub-frame, and the interval information includes information related to a start timing and an end timing of the beam-formed random access interval, information related to the number of slots included in the beam-formed random access interval and a length per slot, and information related to a beam allocated per each slot. The beam-formed random access resource information may be transmitted with a static or semi-static scheme, e.g., through system information, or with a dynamic scheme, e.g., through a control message.

After receiving the beam-formed random access resource information from the mmWave base station #1 613, the UE #1 611 selects slot # x which corresponds to a beam $B_x$, and performs a random access operation which corresponds to this at operation 637. That is, operations 635 and 637 correspond to a beam-formed random access interval within the first sub-frame.

After the first sub-frame elapses, the mmWave base station #2 615 transmits beam-formed random access resource information to the UE #1 611 in the second sub-frame at operation 639. The beam-formed random access resource information has been described above, and a detailed description thereof will be omitted herein.

After receiving the beam-formed random access resource information from the mmWave base station #2 615, the UE #1 611 selects the slot # x which corresponds to the beam $B_x$, and performs a random access operation which corresponds to this at operation 641. That is, operations 639 and 641 correspond to a beam-formed random access interval within the second sub-frame.

Although FIG. 6 illustrates still another example of a random access process in a communication system supporting a beam-forming scheme according to an embodiment of the present disclosure, various changes could be made to FIG. 6. For example, although shown as a series of operations, various operations in FIG. 6 could overlap, occur in parallel, occur in a different order, or occur multiple times.

Still another example of a random access process in a communication system supporting a beam-forming scheme according to an embodiment of the present disclosure has been described with reference to FIG. 6, and an example of implementation of a random access process in a communication system supporting a beam-forming scheme according to an embodiment of the present disclosure will be described with reference to FIG. 7.

Figure 7:
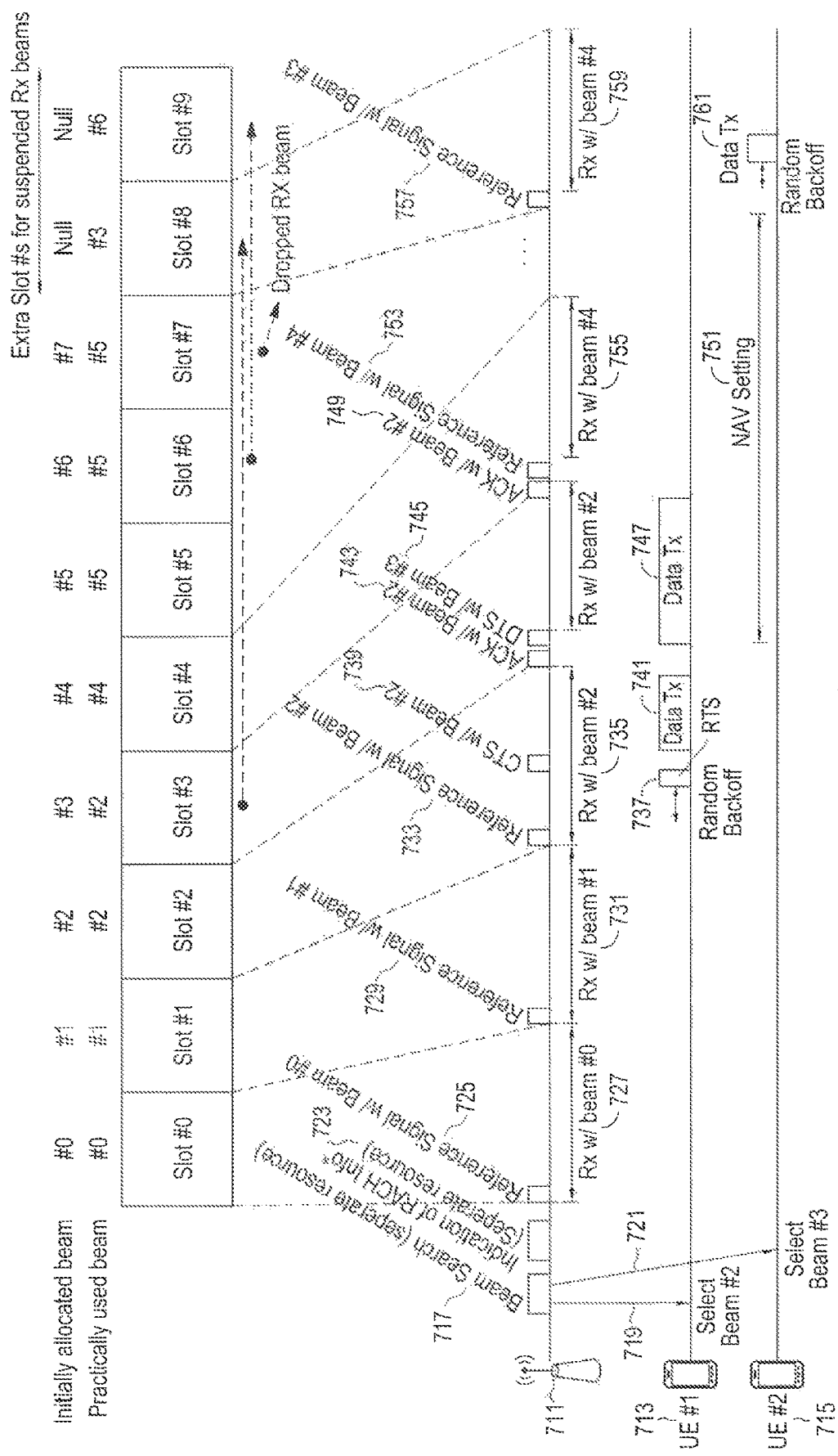
FIG. 7 schematically illustrates an example of implementation of a random access process in a communication system supporting a beam-forming scheme according to an embodiment of the present disclosure.

FIG. 7 schematically illustrates an example of implementation of a random access process in a communication system supporting a beam-forming scheme according to an embodiment of the present disclosure.

Referring to FIG. 7, a communication system supporting the beam-forming scheme includes a base station 711, UE #1 713, and UE #2 715.

First, the base station 711 transmits a BMRS as a reference signal used for beam measurement at operation 717. Each of the UE #1 713 and the UE #2 715 receives from the BMRS transmitted by the base station 711, and selects an optimal beam which is optimal for each of the UE #1 713 and the UE #2 715 based on the received BMRS at operations 719 and 721. In FIG. 7, it will be assumed that the UE #1 713 selects beam #2 as the optimal beam, and the UE #2 715 selects beam #3 as the optimal beam. If the UE #1 713 and the UE #2 715 select the same beam as the optimal beam, the UE #1 713 and the UE #2 715 perform a random access operation based on a contention-based scheme in the same slot.

Meanwhile, the base station 711 transmits beam-formed random access resource information at operation 723. Here, the beam-formed random access resource information includes interval information, i.e., information about a beam-formed random access interval within a specific sub-frame, and the interval information includes information related to a start timing and an end timing of the beam-formed random access interval, information related to the number of slots included in the beam-formed random access interval and a length per slot, and information related to a beam allocated per each slot. The beam-formed random access resource information may be transmitted with a static or semi-static scheme, e.g., through system information, or with a dynamic scheme, e.g., through a control message.

The base station 711 may inform UEs of reception beam information which corresponds to each slot through beam-formed random access resource information. For example, in FIG. 7, it will be assumed that the number of reception beams supported in the base station 711 N_Beam is 8 (N_Beam=8). So, the reception beams supported in the base station 711 include total 8 beams beam #0, beam #1, beam #2, beam #3, beam #4, beam #5, beam #6, and beam #7. The base station 711 supports total 8 beams, so the base station 711 transmits reception beam information based on a corresponding beam for 8 slots which correspond to these, and performs an RTS packet reception attempt operation. For example, in FIG. 7, it will be assumed that the beam #0 is applied to slot #0, the beam #1 is applied to slot #1, the beam #2 is applied to slot #2, the beam #3 is applied to slot #3, the beam #3 is applied to slot #4, the beam #5 is applied to slot #5, the beam #6 is applied to slot #6, and the beam #7 is applied to slot #7. Further, it will be assumed that the base station 711 supports at least one suspended slot, e.g., two suspended slots, e.g., slot #8 and slot #9.

Relation between a beam index and a slot supported in the base station 711 may be expressed as Equation (1).

$$i_{Beam}(x) = \begin{cases} \text{Index\_slot} & , \text{for } x < \text{N\_Beam} \\ \text{Null} & , \text{otherwise} \end{cases} \quad \text{Equation 1}$$

In Equation (1), $i_{Beam}(x)$ denotes a beam index in slot # x.

Meanwhile, the UE #1 713 and the UE #2 715 receive the beam-formed random access resource information transmitted by the base station 711, and selects an access slot which corresponds to an optimal beam selected by each of the UE #1 713 and the UE #2 715 based on the received beam-formed random access resource information. Here, the UE #1 713 selects the beam #2 as the optimal beam, so the UE #1 713 selects the slot #2 as the access slot, and the UE #2 715 selects the beam #3 as the optimal beam, so the UE #2 715 selects the slot #3 as the access slot.

Meanwhile, the base station 711 transmits reception beam information per slot in each slot, and performs an RTS packet reception attempt operation of attempting to receive an RTS packet corresponding to a reception beam per slot in a corresponding slot. This will be described below.

The base station 711 transmits a reference signal based on beam #0 in slot #0 at operation 725, and performs an RTS packet reception attempt operation based on the beam #0 at operation 727.

The base station 711 transmits a reference signal based on beam #1 in slot #1 at operation 729, and performs an RTS packet reception attempt operation based on the beam #1 at operation 731.

The base station 711 transmits a reference signal based on beam #2 in slot #2 at operation 733, and performs an RTS packet reception attempt operation based on the beam #2 at operation 735. The UE #1 713 transmits, to the base station 711, an RTS packet based on the beam #2 in the slot #2 at operation 737, so the base station 711 stops a reception beam-sweeping process and transmits a CTS packet in response to the RTS packet based on the beam #2 at operation 739. The UE #1 713 transmits the RTS packet after random backoff time from a start timing of a corresponding slot, i.e., the slot #2. Here, the random backoff time may be determined by considering time required for a denial to send (DTS) packet transmitting/receiving operation assuming a case that the DTS packet is transmitted. For example, the random backoff time may be randomly determined for each UE. If an RTS packet or a data packet is transmitted at a timing at which the DTS packet is transmitted for decreasing latency, retransmission of the RTS packet or the data packet is not permitted. The DTS packet is a packet indicating that the base station 711 rejects a random access for a corresponding UE.

The reason why the UE #1 713 transmits the RTS packet after the random backoff time without transmitting the RTS packet at the start timing of the slot #2 is for preventing a case that the base station 711 may not transmit a CTS packet while the RTS packet is transmitted in a corresponding slot. Alternatively, the UE #1 713 may transmit the RTS packet at the start timing of the slot #2, and this RTS packet transmission which does not consider the random backoff time may mainly occur in a case that a data packet to be transmitted in the UE #1 713 is a short data packet.

Upon receiving the CTS packet from the base station 711, the UE #1 713 transmits a data packet to the base station 711 at operation 741. Upon receiving the data packet from the UE #1 713, the base station 711 transmits an ACK packet indicating that the data packet is normally received based on beam #2 at operation 743. If it is impossible to transmit all of data which the UE #1 713 intents to transmit in the slot #2, that is, if amount of the data to be transmitted in the UE #1 713 is greater than amount of data which may be transmitted in a slot selected by the UE #1 713, i.e., the slot #2, the base station 711 transmits a DTS packet based on beam #3 at operation 745. Here, an operation of transmitting a DTS packet in the base station 711 will be described below.

First, a preset reception beam is corresponded to each slot, and reception beam information per slot has been already shared to UEs through beam-formed random access resource information. So, the base station 711 needs to transmit a DTS packet in order that the base station 711 does not use a reception beam # Y which corresponds to a specific slot, e.g., a slot # X and uses another reception beam # Z in the slot # x. Here, the DTS packet may be used for notifying, to a UE which wants to perform an access operation based on the reception beam # Y in the slot # X, that it is impossible to perform the access operation in the slot # X. In this case, the base station 711 may transmit information about a slot in which an access which is based on the reception beam # Y is possible along with the DTS packet. If it is assumed that the slot in which the access which is based on the reception beam # Y is possible is a slot # X', in a case of FIG. 7, (X, Y, Z, X') may be (3, 3, 2, 8), (6, 6, 5, 9), (7, 7, 5, Null), respectively.

The base station 711 may allocate the slot # X' as suspended slots, so the base station 711 does not apply an initial reception beam to the slot #8 and the slot #9.

If there is no slot which will be allocated as the slot # X' (X'=Null), the base station 711 does not allocate a suspended slot in a corresponding RACH interval. If the number of reception beams practically used is less than the number of reception beams which are set to one slot in advance, the base station 711 may transmit a DTS packet in slots which correspond to reception beams except for the reception beams practically used among the preset reception beams.

The UE #1 713 transmits a data packet to the base station 711 based on the beam #2 in a slot #2 at operation 747. Upon receiving the data packet from the UE #1 713, the base station 711 transmits an ACK packet indicating that the data packet is normally received based on the beam #2 at operation 749.

Even though the UE #2 715 needs to transmit a data packet in a slot #3 by performing an access operation to the base station 711, the UE #2 715 may not perform the access operation due to the data packet transmitting operation of the UE #1 713. That is, the UE #2 715 recognizes that the UE #2 715 may not perform an access operation to the base station 711 in the slot #3 as the UE #2 715 receives the DTS packet from the base station 711, so the UE #2 715 immediately sets a network allocation vector (NAV) at operation 751. The reason why the UE #2 715 sets the NAV is for preventing collision with another UE which is currently performing an access operation.

The base station 711 transmits a reference signal based on a beam #4 in a corresponding slot, i.e., a slot #4 at operation 753, and performs an RTS packet reception attempt operation based on the beam #4 at operation 755.

In this way, if a beam #3 is used as a reception beam in a corresponding slot while the base station 711 transmits reception beam information in corresponding slots and performs an RTS packet reception attempt operation based on a corresponding reception beam, the base station 711 transmits a reference signal based on the beam #3 at operation 757, and performs an RTS packet reception attempt operation based on the beam #3 at operation 759. Since the NAV setting is completed, the UE #2 715 transmits a data packet to the base station 711 at operation 761.

An example of implementation of a random access process in a communication system supporting a beam-forming scheme according to an embodiment of the present disclosure has been described with reference to FIG. 7, and another example of implementation of a random access process in a communication system supporting a beam-forming scheme according to an embodiment of the present disclosure will be described with reference to FIG. 8.

Figure 8:
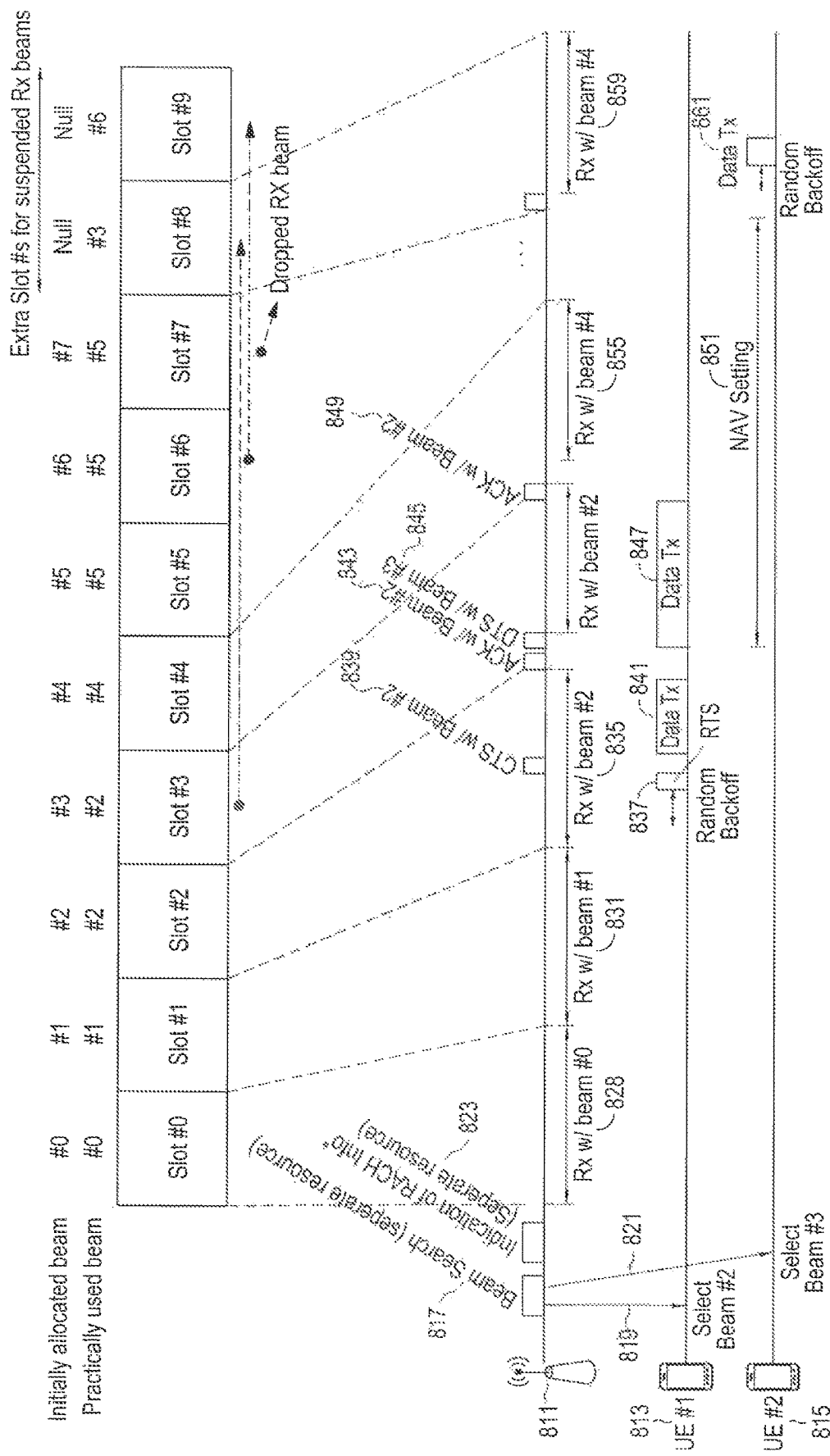
FIG. 8 schematically illustrates another example of implementation of a random access process in a communication system supporting a beam-forming scheme according to an embodiment of the present disclosure.

FIG. 8 schematically illustrates another example of implementation of a random access process in a communication system supporting a beam-forming scheme according to an embodiment of the present disclosure.

Referring to FIG. 8, a random access process as illustrated in FIG. 8 is the same as a random access process as illustrated in FIG. 7 except for that a reference signal is not transmitted at a start timing of each slot and only a DTS packet is transmitted at the start timing of each slot.

That is, if a reference signal is not received from a base station 811, a UE #1 813 and a UE #2 815 may perform an operation based on a reference signal which has been received previously. If a packet is received from a start timing of each slot, the UE #1 813 and the UE #2 815 determine the received packet as a DTS packet, and does not perform an access operation in a corresponding slot since the DTS packet is received.

That is, an operation of operation 817, operation 819, operation 821, operation 823, operation 827, operation 831, operations 835 to 849, operation 851, operation 855, operation 859, and operation 861 in FIG. 8 is similar to an operation of operation 717, operation 719, operation 721, operation 723, operation 727, operation 731, operations 735 to 749, operation 751, operation 755, operation 759, and operation 761 in FIG. 7, so a detailed description thereof will be omitted herein.

Another example of implementation of a random access process in a communication system supporting a beam-forming scheme according to an embodiment of the present disclosure has been described with reference to FIG. 8, and still another example of implementation of a random access process in a communication system supporting a beam-forming scheme according to an embodiment of the present disclosure will be described with reference to FIG. 9.

Figure 9:
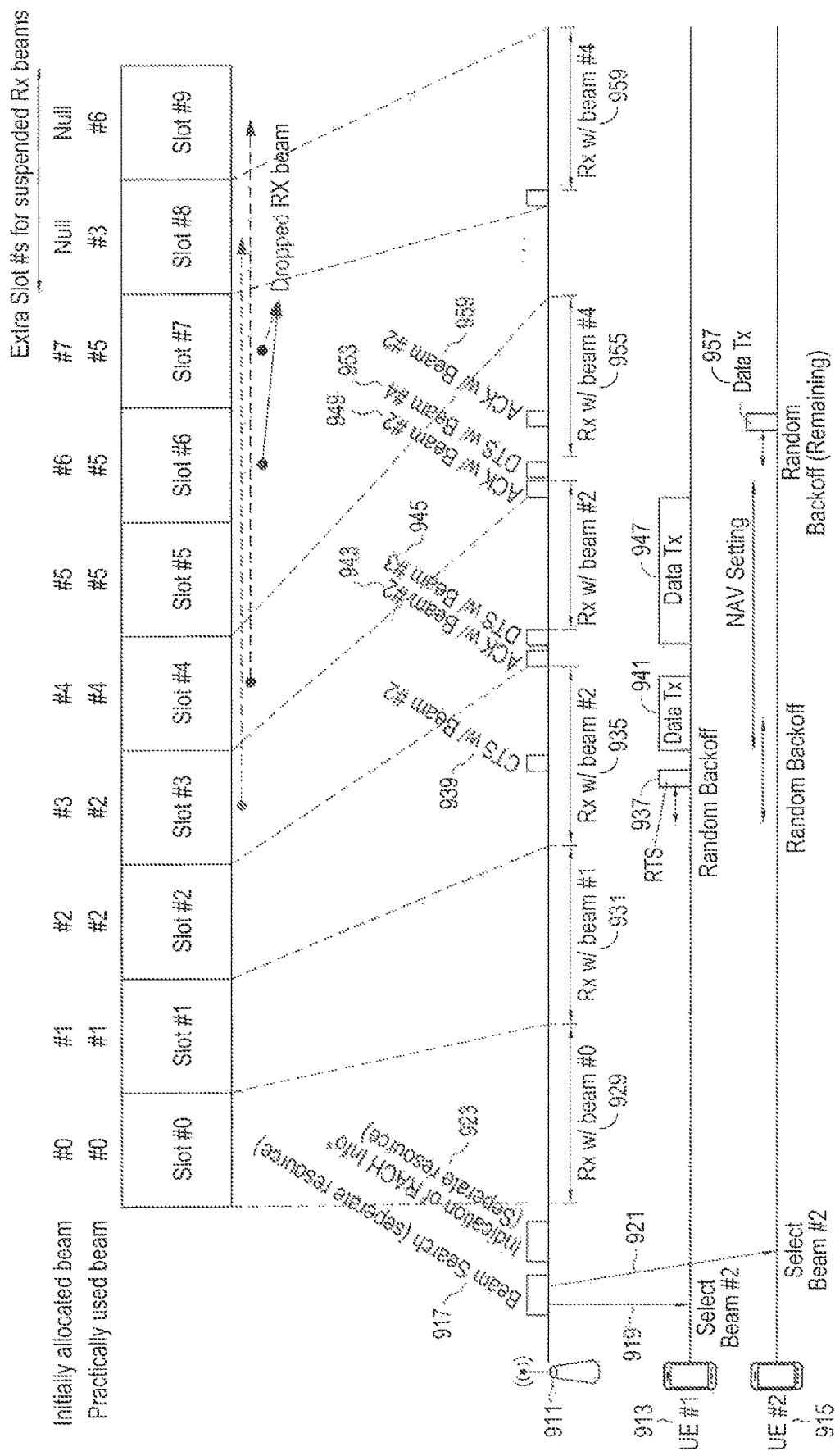
FIG. 9 schematically illustrates still another example of implementation of a random access process in a communication system supporting a beam-forming scheme according to an embodiment of the present disclosure.

FIG. 9 schematically illustrates still another example of implementation of a random access process in a communication system supporting a beam-forming scheme according to an embodiment of the present disclosure.

Referring to FIG. 9, a random access process as illustrated in FIG. 9 is the same as a random access process as illustrated in FIG. 8 except for that UEs, i.e., a UE #1 913 and a UE #2 915 select the same beam, i.e., a beam #2 as an optimal beam.

That is, the UE #1 913 and the UE #2 915 select the beam #2 as the optimal beam, so the UE #1 913 and the UE #2 915 select different random backoff time in a slot #3, and the UE #1 913 which selects the earlier random backoff time among the UE #1 913 and the UE #2 915 transmits an RTS packet to the base station 911 first at operation 937. The UE #2 915 which selects the later random backoff time may detect current RACH occupied status by receiving a CTS packet transmitted by the base station 911 to the UE #1 913 at operation 939.

So, the UE #2 915 sets NAV until the RACH occupation by the UE #1 913 ends at operation 951. If the NAV setting ends, the UE #2 915 detects whether the RACH is in free status based on occupation status of the RACH, and performs an access operation if the RACH is in the free status at operation 957. If the RACH is still in the occupied status, the UE #2 915 receives a control packet, e.g., a CTS packet or an ACK packet from the base station 911, and sets the NAV again. Alternatively, if the RACH is in free status, a control packet is not received from the base station 911, so the UE #2 915 performs an access operation.

Still another example of implementation of a random access process in a communication system supporting a beam-forming scheme according to an embodiment of the present disclosure has been described with reference to FIG. 9, and an operating process of a base station in a communication system supporting a beam-forming scheme according to an embodiment of the present disclosure will be described with reference to FIG. 10.

Figure 10:
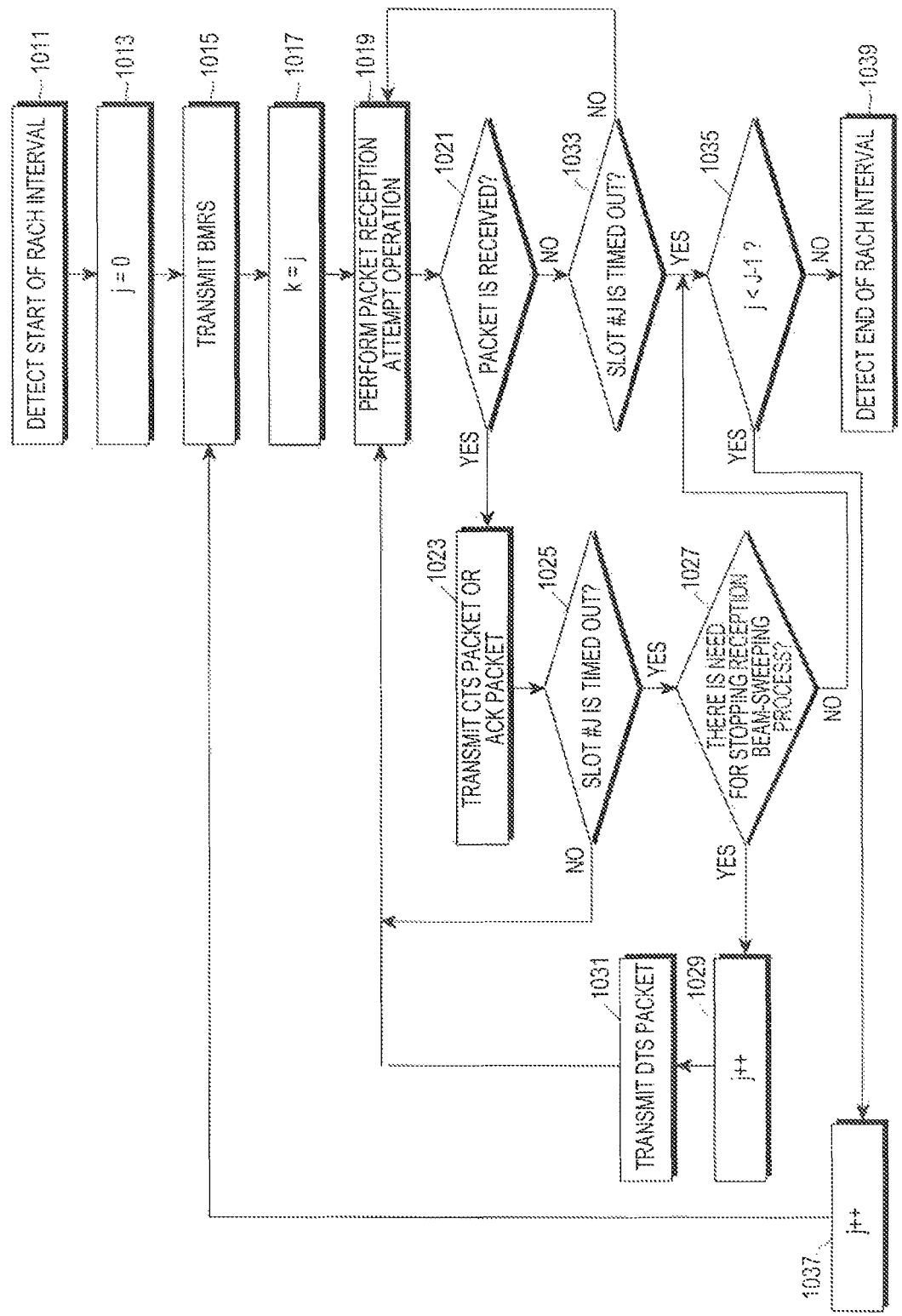
FIG. 10 schematically illustrates an operating process of a base station in a communication system supporting a beam-forming scheme according to an embodiment of the present disclosure.

FIG. 10 schematically illustrates an operating process of a base station in a communication system supporting a beam-forming scheme according to an embodiment of the present disclosure.

Referring to FIG. 10, the base station detects that a RACH duration starts at operation 1011, and proceeds to operation 1013. The base station sets a variable value of a variable j as a variable indicating a slot index indicating a slot to 0 (j=0) at operation 1013, and proceeds to operation 1015. The base station transmits a BMRS based on a transmission beam # $i_{Beam}(j)$ as a beam which corresponds to a transmission beam index $i_{Beam}(j)$ in a slot # j at operation 1015, and proceeds to operation 1017. The base station sets a variable value of a variable k as a variable related to a reception beam index $i_{Beam}(k)$ to j (k=j) at operation 1017, and proceeds to operation 1019. The base station performs a packet reception attempt operation for a UE based on a reception beam # $i_{Beam}(k)$ as a beam which corresponds to the reception beam index $i_{Beam}(k)$ at operation 1019, and proceeds to operation 1021. The base station determines whether a packet is received from a UE at operation 1021. If the packet is received from the UE, the base station proceeds to operation 1023.

The base station transmits a CTS packet or an ACK packet corresponding to the received packet at operation 1023, and proceeds to operation 1025. Here, if the packet received by the base station from the UE is an RTS packet, the base station transmits the CTS packet to the UE. If the packet received by the base station from the UE is a data packet, the base station transmits the ACK packet to the UE. The UE determines whether the slot # j is timed out at operation 1025. If the slot # j is not timed out, the base station returns to operation 1019.

If the slot # j is timed out at operation 1025, the base station proceeds to operation 1027. The base station determines whether there is a need for stopping a reception beam-sweeping process at operation 1027. If there is the need for stopping the reception beam-sweeping process, the base station proceeds to operation 1029. The base station increases a value of the slot index j by a preset value, e.g., 1 at operation 1029, and proceeds to operation 1031. The reception beam-sweeping process has been stopped, so the base station transmits a DTS packet based on a transmission beam # $i_{Beam}(j)$ for preventing that another UE other than the UE transmits a packet in a corresponding slot at operation 1031, and returns to operation 1019.

If there is no need for stopping the reception beam-sweeping process at operation 1027, the base station proceeds to operation 1035. The base station determines whether the value of the variable j is less than J−1 at operation 1035. Here, J denotes the number of slots included in one sub-frame.

If the packet is not received from the UE at operation 1021, the base station proceeds to operation 1033. The base station determines whether the slot # j is timed out at operation 1033. If the slot # j is not timed out, the base station returns to operation 1019.

If the slot # j is timed out, the base station proceeds to operation 1035. The base station determines whether the value of the variable j is less than J−1 at operation 1035. If the value of the variable j is less than J−1, the base station proceeds to operation 1037. The base station increases the value of the slot index j by a preset value, e.g., 1 at operation 1037, and returns to operation 1015.

If the value of the variable j is not less than J−1, that is, if the value of the variable j is greater than or equal to J−1, the base station proceeds to operation 1039. The base station detects that the RACH interval ends at operation 1039.

Although FIG. 10 illustrates an operating process of a base station in a communication system supporting a beam-forming scheme according to an embodiment of the present disclosure, various changes could be made to FIG. 10. For example, although shown as a series of operations, various operations in FIG. 10 could overlap, occur in parallel, occur in a different order, or occur multiple times.

An operating process of a base station in a communication system supporting a beam-forming scheme according to an embodiment of the present disclosure has been described with reference to FIG. 10, and an operating process of a UE in a communication system supporting a beam-forming scheme according to an embodiment of the present disclosure will be described with reference to FIG. 11.

Figure 11:
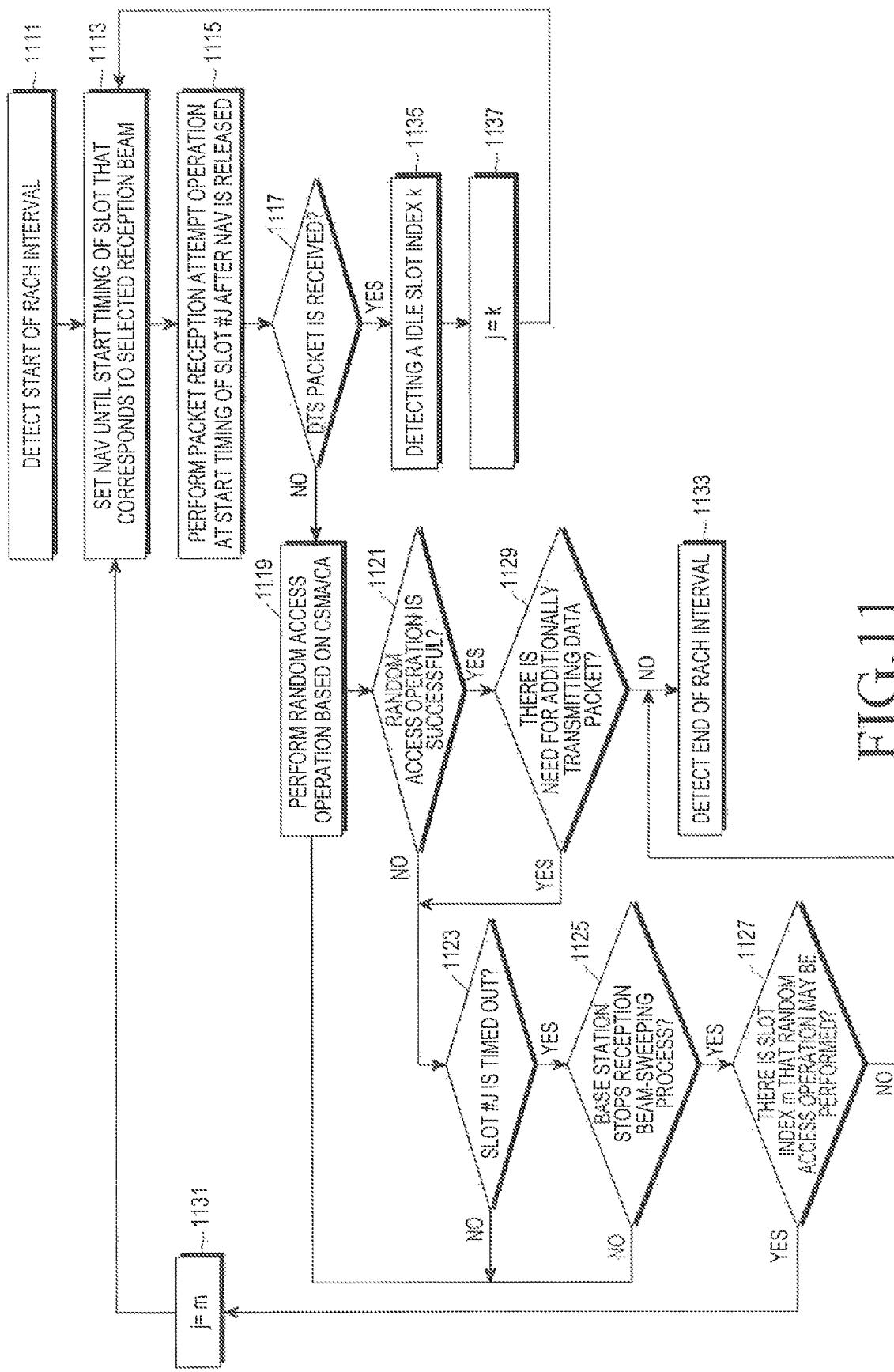
FIG. 11 schematically illustrates an operating process of a UE in a communication system supporting a beam-forming scheme according to an embodiment of the present disclosure.

FIG. 11 schematically illustrates an operating process of a UE in a communication system supporting a beam-forming scheme according to an embodiment of the present disclosure.

Referring to FIG. 11, the UE detects start of an RACH interval at operation 1111, and proceeds to operation 1113. The UE sets an NAV until a start timing of a slot which corresponds to a reception beam selected by the UE at operation 1113, and proceeds to operation 1115. Here, it will be assumed that a reception beam index selected by the UE is $i_{Beam}(j)$ and a slot which corresponds to the reception beam index $i_{Beam}(j)$ is slot #j. After the NAV is released, the UE performs a packet reception attempt operation for a base station based on reception beam $i_{Beam}(j)$ at a start timing of the slot #j at operation 1115, and proceeds to operation 1117. The UE determines whether a DTS packet is received from the base station at operation 1117. If the DTS packet is not received from the base station, the UE proceeds to operation 1119.

The UE performs a random access operation which is based on carrier sense multiple access/collision avoidance (CSMA/CA) at operation 1119, and proceeds to operation 1121. The UE may know whether the base station stops a reception beam-sweeping process while performing the random access operation which is based on CSMA/CA. The UE determines whether the random access operation is successful at operation 1121. If the random access operation is unsuccessful, the UE proceeds to operation 1123.

The UE determines whether the slot # j is timed out at operation 1123. If the slot # j is not timed out, the UE returns to operation 1119.

If the slot # j is timed out, the UE proceeds to operation 1125. The UE determines whether the base station stops the reception beam-sweeping process at operation 1125. If the base station does not stop the reception beam-sweeping process, the UE returns to operation 1119.

If the base station stops the reception beam-sweeping process, the UE proceeds to operation 1127. The UE determines whether there is a slot index m at which the UE may perform a random access operation at operation 1127. If there is the slot index m at which the UE may perform the random access operation, the UE returns to operation 1131.

The UE sets the slot index j to m (j=m) at operation 1131, and returns to operation 1113.

If there is not the slot index m at which the UE may perform the random access operation at operation 1127, the UE proceeds to operation 1133. The UE detects that the RACH interval ends at operation 1133.

If the random access operation is successful at operation 1121, the UE proceeds to operation 1129. The UE determines whether there is a need for additionally transmitting a data packet at operation 1129. If there is the need for additionally transmitting the data packet, the UE proceeds to operation 1123.

If there is no need for additionally transmitting the data packet at operation 1129, the UE proceeds to operation 1133.

If the DTS packet is received from the base station at operation 1117, the UE proceeds to operation 1135. The UE detects an idle slot index k which corresponds to the slot # j at operation 1135, and proceeds to operation 1137. The UE sets the slot index j to k (j=k) at operation 1137, and returns to operation 1113.

Although FIG. 11 illustrates an operating process of a UE in a communication system supporting a beam-forming scheme according to an embodiment of the present disclosure, various changes could be made to FIG. 11. For example, although shown as a series of operations, various operations in FIG. 11 could overlap, occur in parallel, occur in a different order, or occur multiple times.

An operating process of a UE in a communication system supporting a beam-forming scheme according to an embodiment of the present disclosure has been described with reference to FIG. 11, and an example of a super frame structure in a communication system supporting a beam-forming scheme according to an embodiment of the present disclosure will be described with reference to FIG. 12.

Figure 12:
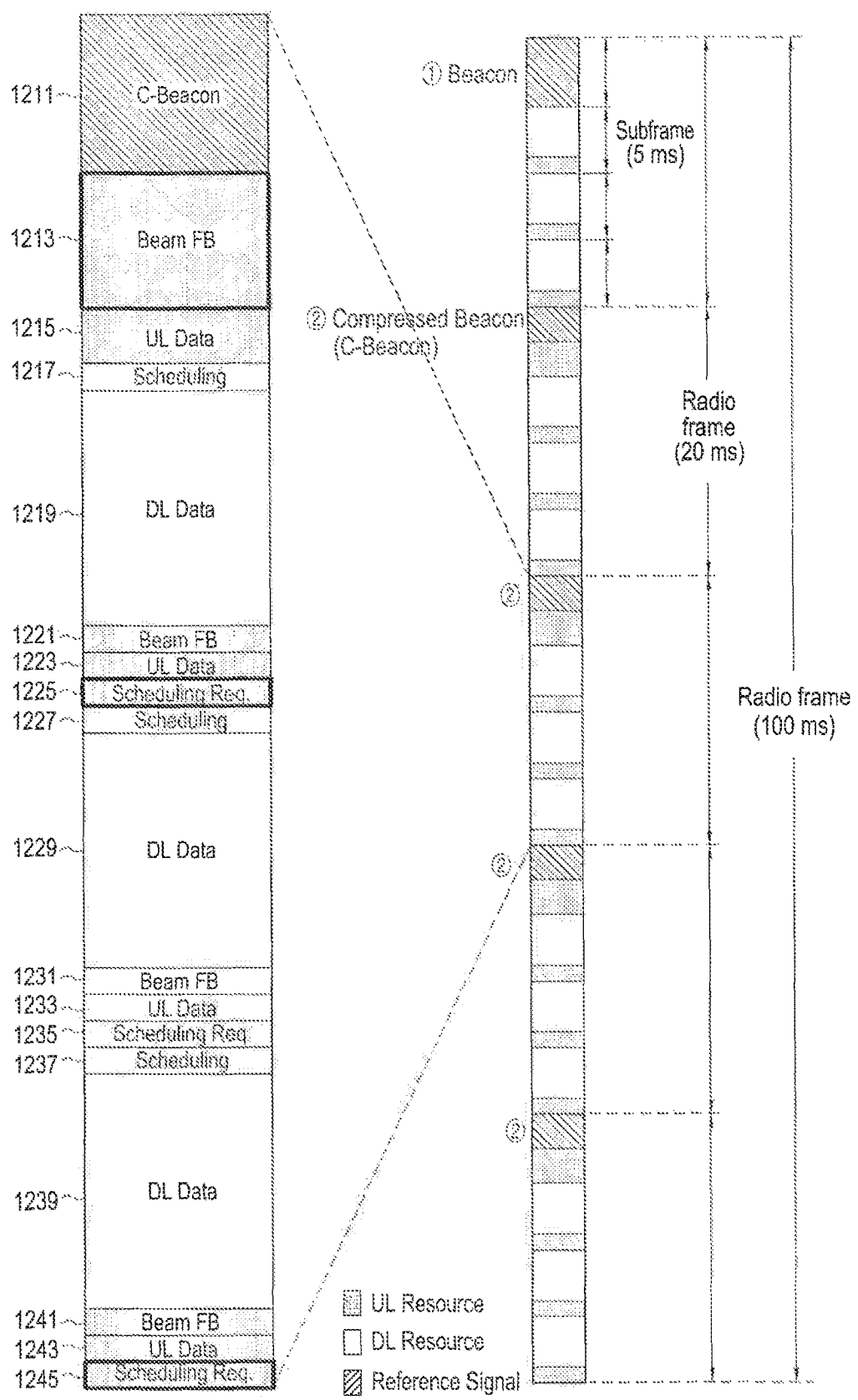
FIG. 12 schematically illustrates an example of a super frame structure in a communication system supporting a beam-forming scheme according to an embodiment of the present disclosure.

FIG. 12 schematically illustrates an example of a super frame structure in a communication system supporting a beam-forming scheme according to an embodiment of the present disclosure.

Referring to FIG. 12, for example, a super frame has a length of 100 ms and five radio frames. Each of the five radio frames has a length of 20 ms. Here, a radio frame includes four sub-frames, and each of the four sub-frames has a length of 5 ms.

Furthermore, a reference signal is transmitted in a specific part, e.g., a start part of each radio frame, a reference signal, e.g., a beacon signal is transmitted in a start part of a specific frame among radio frames included in the super frame, e.g., the first radio frame, and a compressed reference signal, e.g., a compressed beacon (C-Beacon) signal is transmitted in a start part of remaining radio frames except for the specific frame among the radio frames included in the super frame.

Meanwhile, each of radio frames except for a radio frame in which a beacon signal is transmitted includes a region 1211 in which a C-Beacon signal is transmitted, regions 1213, 1221, 1231, and 1241 in which beam-related information is fed back, regions 1215, 1223, 1233, and 1243 in which a uplink data packet is transmitted, regions 1217, 1227, and 1237 in which scheduling-related information is transmitted, regions 1219, 1229, and 1239 in which a downlink data packet is transmitted, and regions 1225, 1235, and 1245 in which a scheduling request packet is transmitted. In FIG. 12, for convenience, it will be noted that a region in which beam-related information is fed back is shown as "Beam FB", a region in which a uplink data packet is transmitted is shown as "UL Data", a region in which scheduling-related information is transmitted is shown as "Scheduling", a region in which a downlink data packet is transmitted is shown as "DL data", and a region in which a scheduling request packet is transmitted is shown as "scheduling Req.".

As illustrated in FIG. 12, it will be understood that a uplink resource is managed based on a random access or scheduling.

It will be noted that an order of the region 1211 in which the C-Beacon signal is transmitted, the regions 1213, 1221, 1231, and 1241 in which the beam-related information is fed back, the regions 1215, 1223, 1233, and 1243 in which the uplink data packet is transmitted, the regions 1217, 1227, and 1237 in which the scheduling-related information is transmitted, the regions 1219, 1229, and 1239 in which the downlink data packet is transmitted, and the regions 1225, 1235, and 1245 in which the scheduling request packet is transmitted as shown in FIG. 12 is just an example, and is not limited to this.

An example of a super frame structure in a communication system supporting a beam-forming scheme according to an embodiment of the present disclosure has been described with reference to FIG. 12, and another example of a super frame structure in a communication system supporting a beam-forming scheme according to an embodiment of the present disclosure will be described with reference to FIG. 13.

Figure 13:
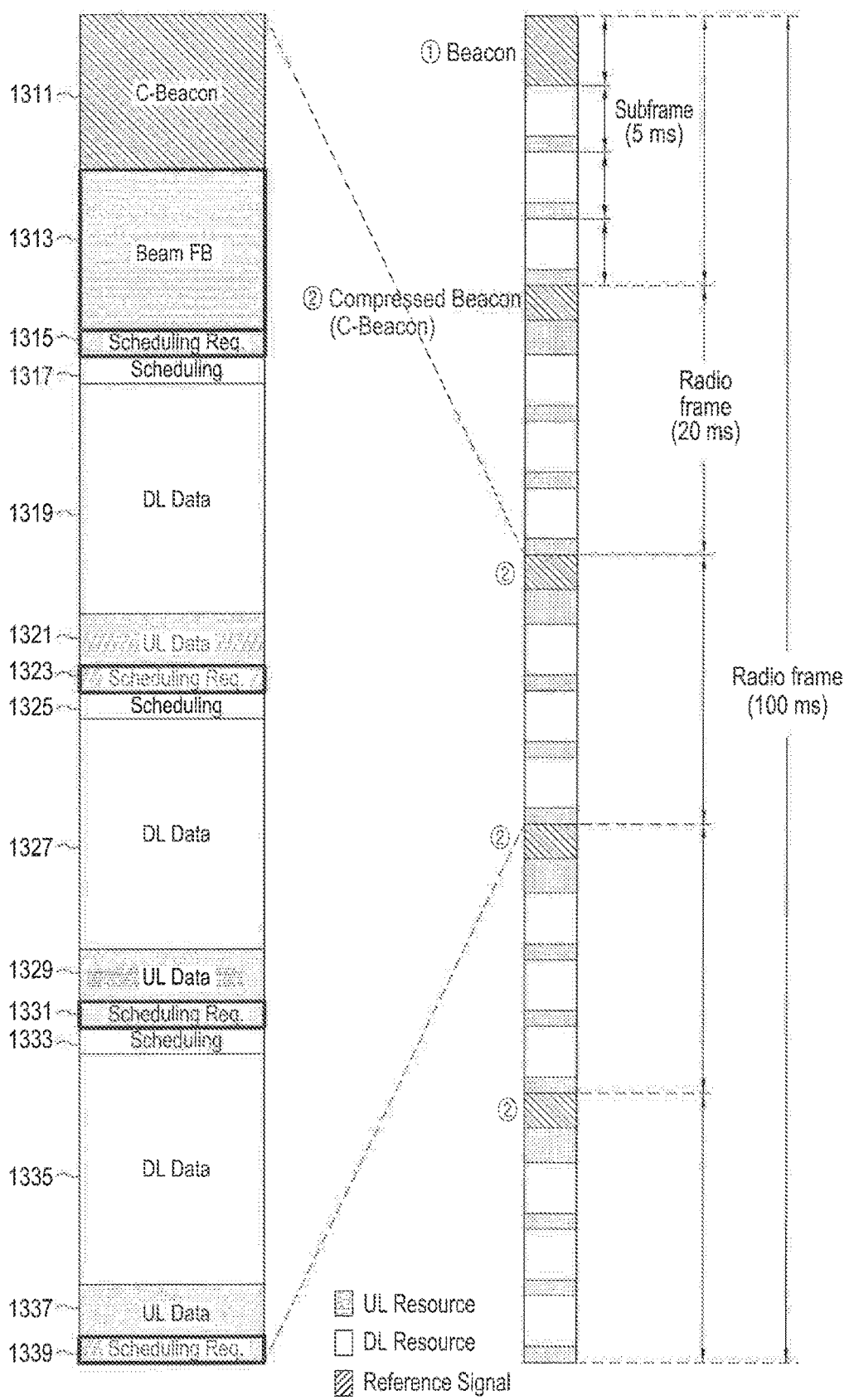
FIG. 13 schematically illustrates another example of a super frame structure in a communication system supporting a beam-forming scheme according to an embodiment of the present disclosure.

FIG. 13 schematically illustrates another example of a super frame structure in a communication system supporting a beam-forming scheme according to an embodiment of the present disclosure.

Referring to FIG. 13, for example, a super frame has a length of 100 ms and five radio frames. Each of the five radio frames has a length of 20 ms. Here, a radio frame includes four sub-frames, and each of the four sub-frames has a length of 5 ms.

Furthermore, a reference signal is transmitted in a specific part, e.g., a start part of each radio frame, a reference signal, e.g., a beacon signal is transmitted in a start part of a specific frame among radio frames included in the super frame, e.g., the first radio frame, and a compressed reference signal, e.g., a C-Beacon signal is transmitted in a start part of remaining radio frames except for the specific frame among the radio frames included in the super frame.

Meanwhile, each of radio frames except for a radio frame in which a beacon signal is transmitted includes a region 1311 in which a C-Beacon signal is transmitted, a region 1313 in which beam-related information is fed back, regions 1321, 1329, and 1337 in which a uplink data packet is transmitted, regions 1317, 1325, and 1333 in which scheduling-related information is transmitted, regions 1319, 1327, and 1335 in which a downlink data packet is transmitted, and regions 1315, 1323, 1331, and 1339 in which a scheduling request packet is transmitted. In FIG. 13, for convenience, it will be noted that a region in which beam-related information is fed back is shown as "Beam FB", a region in which a uplink data packet is transmitted is shown as "UL Data", a region in which scheduling-related information is transmitted is shown as "Scheduling", a region in which a downlink data packet is transmitted is shown as "DL data", and a region in which a scheduling request packet is transmitted is shown as "scheduling Req.".

As illustrated in FIG. 13, it will be understood that a uplink resource is managed based on a random access or scheduling.

It will be noted that an order of the region 1311 in which the C-Beacon signal is transmitted, the region 1313 in which the beam-related information is fed back, the regions 1321, 1329, and 1337 in which the uplink data packet is transmitted, the regions 1317, 1325, and 1333 in which the scheduling-related information is transmitted, the regions 1319, 1327, and 1335 in which the downlink data packet is transmitted, and the regions 1315, 1323, 1331, and 1339 in which the scheduling request packet is transmitted as shown in FIG. 13 is just an example, and is not limited to this.

Another example of a super frame structure in a communication system supporting a beam-forming scheme according to an embodiment of the present disclosure has been described with reference to FIG. 13, and still another example of a super frame structure in a communication system supporting a beam-forming scheme according to an embodiment of the present disclosure will be described with reference to FIG. 14.

Figure 14:
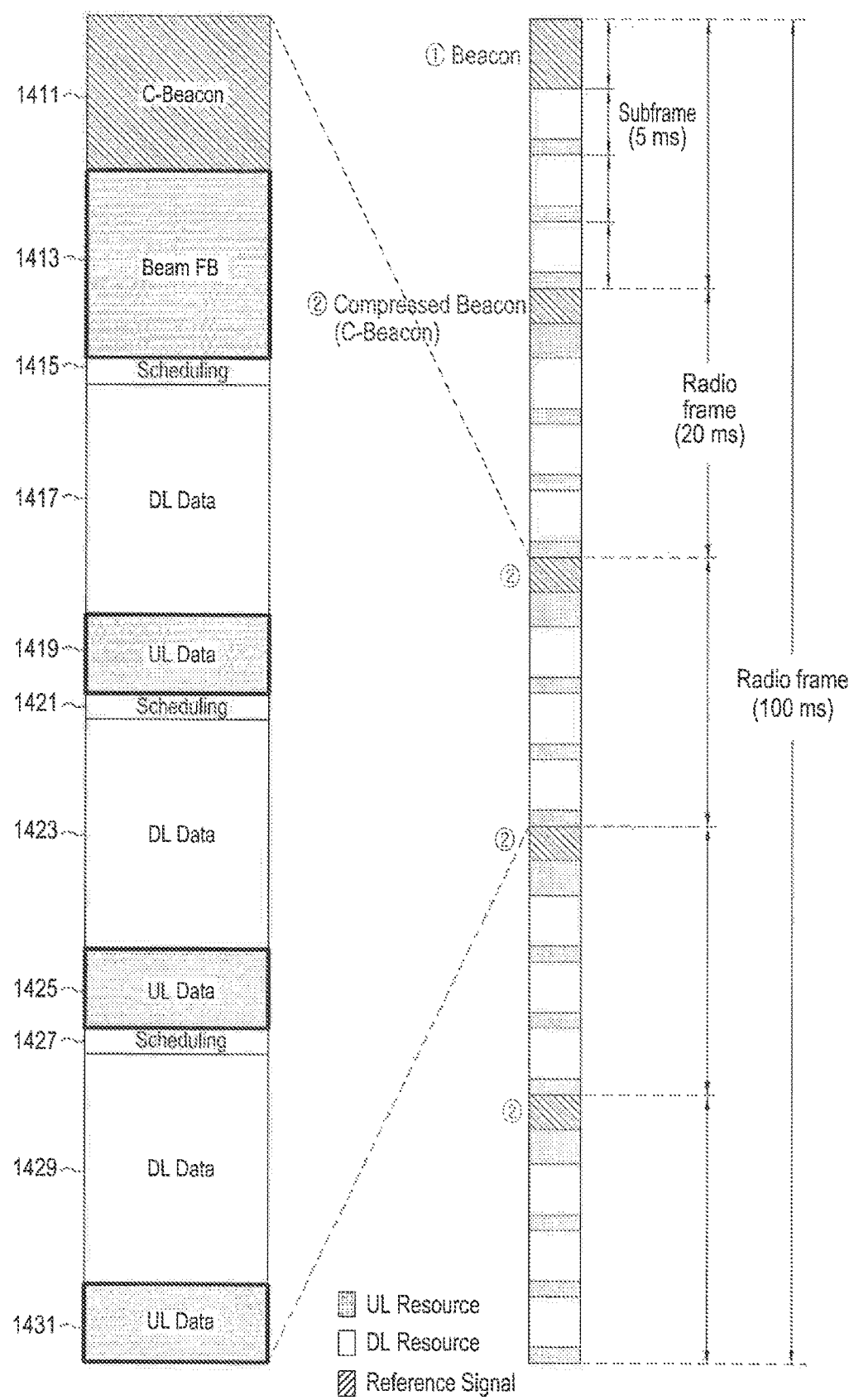
FIG. 14 schematically illustrates still another example of a super frame structure in a communication system supporting a beam-forming scheme according to an embodiment of the present disclosure.

FIG. 14 schematically illustrates still another example of a super frame structure in a communication system supporting a beam-forming scheme according to an embodiment of the present disclosure.

Referring to FIG. 14, for example, a super frame has a length of 100 ms and five radio frames. Each of the five radio frames has a length of 20 ms. Here, a radio frame includes four sub-frames, and each of the four sub-frames has a length of 5 ms.

Furthermore, a reference signal is transmitted in a specific part, e.g., a start part of each radio frame, a reference signal, e.g., a beacon signal is transmitted in a start part of a specific frame among radio frames included in the super frame, e.g., the first radio frame, and a compressed reference signal, e.g., a C-Beacon signal is transmitted in a start part of remaining radio frames except for the specific frame among the radio frames included in the super frame.

Meanwhile, each of radio frames except for a radio frame in which a beacon signal is transmitted includes a region 1411 in which a C-Beacon signal is transmitted, a region 1413 in which beam-related information is fed back, regions 1419, 1425, and 1431 in which a uplink data packet is transmitted, regions 1415, 1421, and 1427 in which scheduling-related information is transmitted, and regions 1417, 1423, and 1429 in which a downlink data packet is transmitted. In the super frame structure in FIG. 14, a region in which a scheduling request packet is transmitted is not included in radio frames except for a radio frame in which a beacon signal is transmitted unlike super frame structures in FIG. 12 and FIG. 13.

In FIG. 14, for convenience, it will be noted that a region in which beam-related information is fed back is shown as "Beam FB", a region in which a uplink data packet is transmitted is shown as "UL Data", a region in which scheduling-related information is transmitted is shown as "Scheduling", and a region in which a downlink data packet is transmitted is shown as "DL data".

As illustrated in FIG. 14, it will be understood that a uplink resource is managed based on a random access or scheduling.

It will be noted that an order of the region 1411 in which the C-Beacon signal is transmitted, the region 1413 in which the beam-related information is fed back, the regions 1419, 1425, and 1431 in which the uplink data packet is transmitted, the regions 1415, 1421, and 1427 in which the scheduling-related information is transmitted, and the regions 1417, 1423, and 1429 in which the downlink data packet is transmitted as shown in FIG. 14 is just an example, and is not limited to this.

Still another example of a super frame structure in a communication system supporting a beam-forming scheme according to an embodiment of the present disclosure has been described with reference to FIG. 14, and an inner structure of a base station in a communication system supporting a beam-forming scheme according to an embodiment of the present disclosure will be described with reference to FIG. 15.

Figure 15:
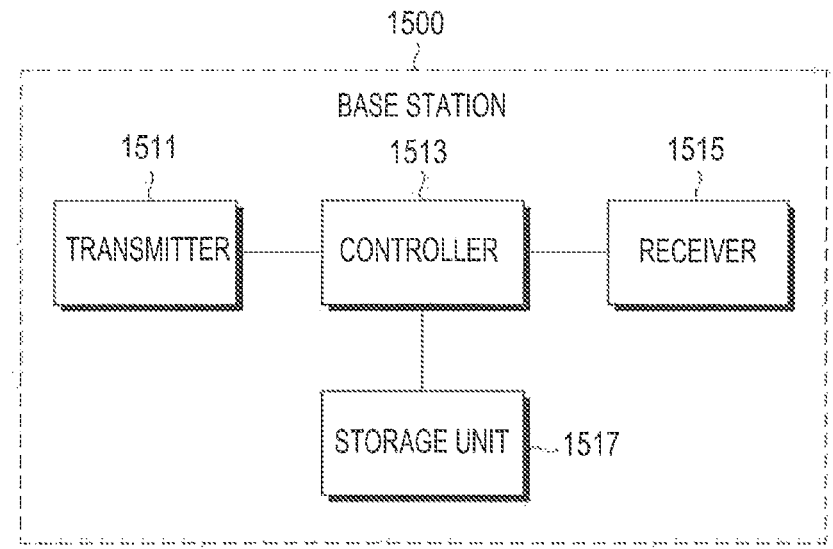
FIG. 15 schematically illustrates an inner structure of a base station in a communication system supporting a beam-forming scheme according to an FIG. 16 schematically illustrates an inner structure of a UE in a communication system supporting a beam-forming scheme according to an embodiment of the present disclosure.

FIG. 15 schematically illustrates an inner structure of a base station in a communication system supporting a beam-forming scheme according to an embodiment of the present disclosure.

Referring to FIG. 15, a base station 1500 includes a transmitter 1511, a controller 1513, a receiver 1515, and a storage unit 1517.

The controller 1513 controls the overall operation of the base station 1500, e.g., an operation related to an operation of performing a random access process in a communication system supporting a beam-forming scheme according to an embodiment of the present disclosure. The operation related to the operation of performing the random access process in the communication system supporting the beam-forming scheme according to an embodiment of the present disclosure has been described with reference to FIGS. 3 to 14, and a detailed description thereof will be omitted herein.

The transmitter 1511 transmits various signals and various messages to other entities, for example, a UE, and/or the like included in the communication system supporting the beam-forming scheme under a control of the controller 1513. The various signals and the various messages transmitted in the transmitter 1511 have been described in FIGS. 3 to 14, and a detailed description thereof will be omitted herein.

The receiver 1515 receives various signals and various messages from the other entities, for example, the UE, and/or the like included in the communication system supporting the beam-forming scheme under a control of the controller 1513. The various signals and the various messages received in the receiver 1515 have been described in FIGS. 3 to 14, and a detailed description thereof will be omitted herein.

The storage unit 1517 stores a program, various data, and/or the like related to the operation related to the operation of performing the random access process in the communication system supporting the beam-forming scheme according to an embodiment of the present disclosure under a control of the controller 1513.

The storage unit 1517 stores the various signals, the various messages, and/or the like received by the receiver 1515 from the other entities.

Although the transmitter 1511, the controller 1513, the receiver 1515, and the storage unit 1517 are described as separate processors in the base station 1500, it is to be understood that the base station 1500 may be implemented with a form in which two or more of the transmitter 1511, the controller 1513, the receiver 1515, and the storage unit 1517 may be integrated. The base station 1500 may be implemented with one processor.

An inner structure of a base station in a communication system supporting a beam-forming scheme according to an embodiment of the present disclosure has been described with reference to FIG. 15, and an inner structure of a UE in a communication system supporting a beam-forming scheme according to an embodiment of the present disclosure will be described with reference to FIG. 16.

Figure 16:
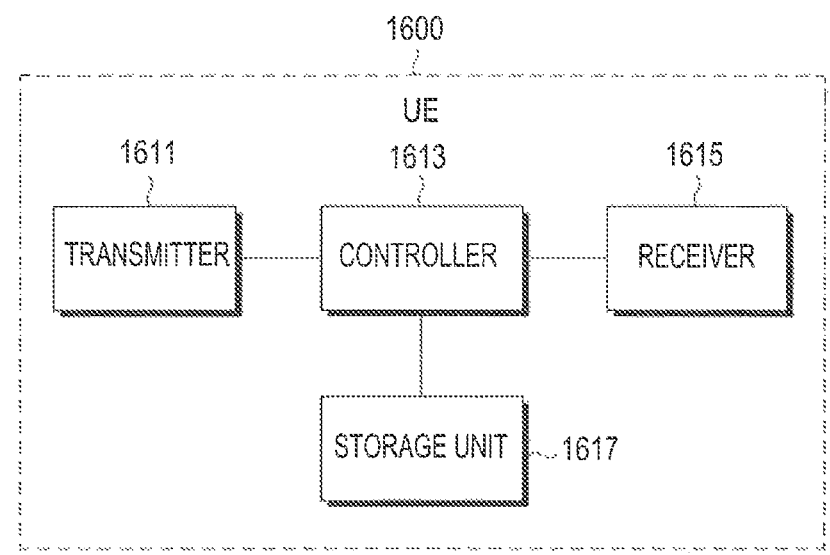

FIG. 16 schematically illustrates an inner structure of a UE in a communication system supporting a beam-forming scheme according to an embodiment of the present disclosure.

Referring to FIG. 16, a UE 1600 includes a transmitter 1611, a controller 1613, a receiver 1615, and a storage unit 1617.

The controller 1613 controls the overall operation of the UE 1600, e.g., an operation related to an operation of performing a random access process in a communication system supporting a beam-forming scheme according to an embodiment of the present disclosure. The operation related to the operation of performing the random access process in the communication system supporting the beam-forming scheme according to an embodiment of the present disclosure has been described with reference to FIGS. 3 to 14, and a detailed description thereof will be omitted herein.

The transmitter 1611 transmits various signals and various messages to other entities, for example, a base station, and/or the like included in the communication system supporting the beam-forming scheme under a control of the controller 1613. The various signals and the various messages transmitted in the transmitter 1611 have been described in FIGS. 3 to 14, and a detailed description thereof will be omitted herein.

The receiver 1615 receives various signals and various messages from the other entities, for example, the base station, and/or the like included in the communication system supporting the beam-forming scheme under a control of the controller 1613. The various signals and the various messages received in the receiver 1615 have been described in FIGS. 3 to 14, and a detailed description thereof will be omitted herein.

The storage unit 1617 stores a program, various data, and/or the like related to the operation related to the operation of performing the random access process in the communication system supporting the beam-forming scheme according to an embodiment of the present disclosure under a control of the controller 1613.

The storage unit 1617 stores the various signals, the various messages, and/or the like received by the receiver 1615 from the other entities.

Although the transmitter 1611, the controller 1613, the receiver 1615, and the storage unit 1617 are described as separate processors in the UE 1600, it is to be understood that the UE 1600 may be implemented with a form in which two or more of the transmitter 1611, the controller 1613, the receiver 1615, and the storage unit 1617 may be integrated. The UE 1600 may be implemented with one processor.

An inner structure of a UE in a communication system supporting a beam-forming scheme according to an embodiment of the present disclosure has been described with reference to FIG. 16, and performance of a random access process supported in a communication system supporting a beam-forming scheme according to an embodiment of the present disclosure will be described with reference to FIG. 17.

Figure 17:
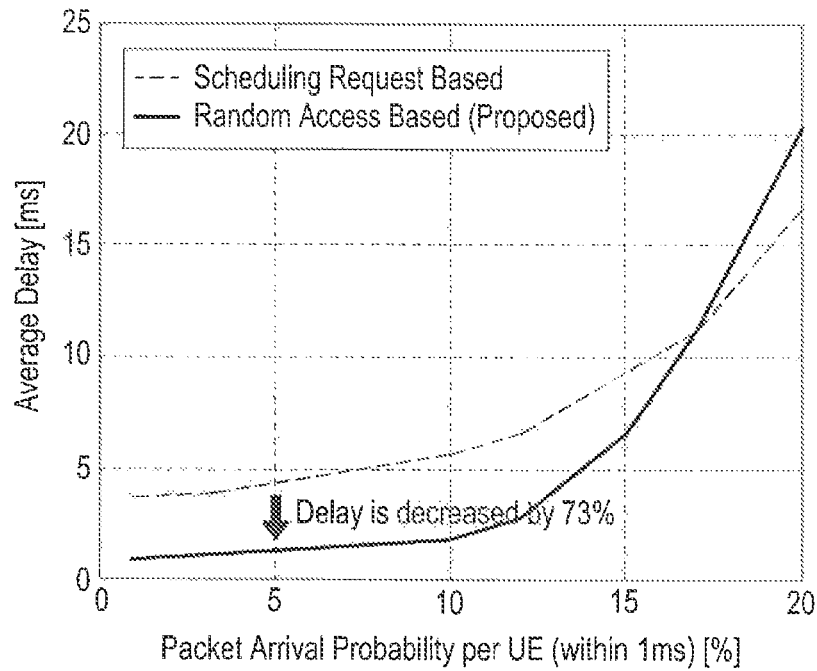
FIG. 17 schematically illustrates performance of a random access process supported in a communication system supporting a beam-forming scheme according to an embodiment of the present disclosure.

FIG. 17 schematically illustrates performance of a random access process supported in a communication system supporting a beam-forming scheme according to an embodiment of the present disclosure.

Referring to FIG. 17, delay time denotes time required for generating a packet and completing transmission of the generated packet. In FIG. 17, a vertical axis indicates average delay time, and a horizontal axis indicates a probability that a packet arrives within 1 ms for each UE (packet arrival probability per UE (within 1 ms)). Further, it will be noted that performance graphs as shown in FIG. 17 are performance graphs in a case that the number of UEs per cell K is 20 (K=20), the number of symbols required for completing packet transmission L is a value within 1~4 (L=1~4 (uniform random)), and the number of beams supported in a base station $N_{beam}$ is 18 ($N_{beam}=18$).

As shown in FIG. 17, it will be understood that delay time in a random access process proposed in an embodiment of the present disclosure decreases by about 73% compared to a general scheduling request based-random access process. For reference, in FIG. 17, it will be noted that performance according to a random access process proposed in an embodiment of the present disclosure is shown as "Random Access Based (Proposed)", and performance according to a general scheduling request based-random access process is shown as "Scheduling Request Based".

Performance of a random access process supported in a communication system supporting a beam-forming scheme according to an embodiment of the present disclosure has been described with reference to FIG. 17, and performance of a random access process supported in a communication system supporting a beam-forming scheme according to an embodiment of the present disclosure in an aspect of an outage rate will be described with reference to FIG. 18.

Figure 18:
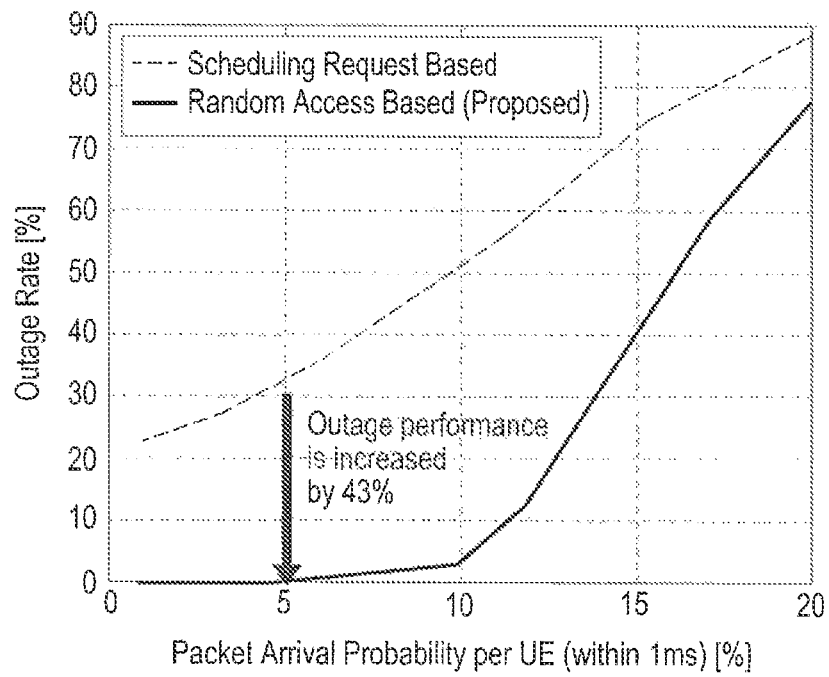
FIG. 18 schematically illustrates performance of a random access process supported in a communication system supporting a beam-forming scheme according to an embodiment of the present disclosure in an aspect of an outage rate.

FIG. 18 schematically illustrates performance of a random access process supported in a communication system supporting a beam-forming scheme according to an embodiment of the present disclosure in an aspect of an outage rate.

Referring to FIG. 18, an outage rate denotes a ratio of total generated packets to packets of which delay time is longer than or equal to specific time, e.g., 5 ms. In FIG. 18, a vertical axis indicates an outage rate, and a horizontal axis indicates a probability that a packet arrives within 1 ms for each UE. Further, it will be noted that performance graphs as shown in FIG. 18 are performance graphs in a case that the number of UEs per cell K is 20 (K=20), the number of symbols required for completing packet transmission L is a value within 1~4 (L=1~4 (uniform random)), and the number of beams supported in a base station $N_{beam}$ is 18 ($N_{beam}$=18).

As shown in FIG. 18, it will be understood that performance in an aspect of an outage rate in a random access process proposed in an embodiment of the present disclosure is improved about 43% compared to a general scheduling request based-random access process. For reference, in FIG. 18, it will be noted that performance according to a random access process proposed in an embodiment of the present disclosure is shown as "Random Access Based (Proposed)", and performance according to a general scheduling request based-random access process is shown as "Scheduling Request Based".

According to an embodiment of the present disclosure, a method for performing a random access process by a base station in a communication system supporting a beam-forming scheme is provided. The method includes transmitting information related to a reception beam which correspond to each unit time interval, performing a reception beam-sweeping process based on the reception beam which corresponds to the unit time interval in each unit time interval, stopping the reception beam-sweeping process upon detecting that a random access process needs to be performed with a user equipment (UE) in a specific unit time interval while performing the reception beam-sweeping process, and performing the random access process with the UE.

Preferably, the detecting that the random access process needs to be performed with the UE in the specific unit time interval while performing the reception beam-sweeping process includes receiving, from the UE, a packet indicating that the UE is scheduled to transmit a data packet to the base station.

Preferably, the packet indicating that the UE is scheduled to transmit the data packet to the base station includes control information related to the random access process, or the packet indicating that the UE is scheduled to transmit the data packet to the base station includes control information related to the random access process, and a part of the data packet or the data packet.

Preferably, the packet indicating that the UE is scheduled to transmit the data packet to the base station is transmitted after preset random backoff time from a start timing of the specific unit time interval, and the random backoff time is randomly determined for each UE.

Preferably, the packet indicating that the UE is scheduled to transmit the data packet to the base station is transmitted through a randomly selected resource, and the randomly selected resource is defined with an index in a frequency axis and a time axis.

Preferably, the random backoff time is determined by considering time at which a packet indicating that the base station rejects the random access for the UE is transmitted and received.

Preferably, the method further comprises, upon receiving a packet requesting a random access after the random backoff time from the UE while the base station performs a random access process with another UE other than the UE, transmitting a response packet to the packet requesting the random access, the response packet includes information indicating whether the base station permits the random access requested from the UE, and a timing at which the another UE is capable of attempting a random access after random backoff time is after the base station transmits the response packet to the UE.

Preferably, wherein the performing the random access process with the UE comprises transmitting, to the UE, a packet indicating that the base station permits the UE to transmit a data packet to the base station; and receiving the data packet from the UE.

Preferably, the method further comprises restarting the stopped reception beam-sweeping process after completing the random access process with the UE.

Preferably, the information related to the reception beam which correspond to each unit time interval includes information related to a start timing and an end timing of a beam-formed random access interval, or includes information related to a base station reception beam which is allocated to each unit time interval included in the beam-formed random access interval.

Preferably, the information related to the reception beam which correspond to each unit time interval includes information related to a base station reception beam which is allocated to each unit time interval included in the beam-formed random access interval.

Preferably, the information related to the base station reception beam includes indexes allocated to a plurality of base station reception beams.

According to an embodiment of the present disclosure, a method for performing a random access process by a user equipment (UE) in a communication system supporting a beam-forming scheme is provided. The method includes receiving, from a base station, information related to a reception beam which correspond to each unit time interval, selecting an optimal beam based on the information related to the reception beam which correspond to each unit time interval, and performing a random access process with the base station in a unit time interval which corresponds to the optimal beam.

Preferably, the performing the random access process with the base station in the unit time interval which corresponds to the optimal beam includes transmitting, to the base station, a packet indicating that the UE is scheduled to transmit a data packet to the base station.

Preferably, the packet indicating that the UE is scheduled to transmit the data packet to the base station includes control information related to the random access process, or the packet indicating that the UE is scheduled to transmit the data packet to the base station includes control information related to the random access process, and a part of the data packet or the data packet.

Preferably, the packet indicating that the UE is scheduled to transmit the data packet to the base station is transmitted after preset random backoff time from a start timing of the specific unit time interval, and the random backoff time is randomly determined for each UE.

Preferably, the packet indicating that the UE is scheduled to transmit the data packet to the base station is transmitted through a randomly selected resource, and the randomly selected resource is defined with an index in a frequency axis and a time axis.

Preferably, the random backoff time is determined by considering time at which a packet indicating that the base station rejects the random access for the UE is transmitted and received.

Preferably, the method further comprises, upon transmitting a packet requesting a random access after the random backoff time to the base station while the base station performs a random access process with another UE other than the UE, receiving, from the base station, a response packet to the packet requesting the random access, the response packet includes information indicating whether the base station permits the random access requested from the UE, and a timing at which the another UE is capable of attempting a random access after random backoff time is after the base station transmits the response packet to the UE.

Preferably, the performing the random access process with the base station in the unit time interval which corresponds to the optimal beam comprises receiving, from the base station, a packet indicating that the UE is permitted to transmit a data packet to the base station; and transmitting the data packet to the base station.

Preferably, the information related to the reception beam which correspond to each unit time interval includes information related to a start timing and an end timing of a beam-formed random access interval.

Preferably, the information related to the reception beam which correspond to each unit time interval includes information related to a start timing and an end timing of a beam-formed random access interval, or includes information related to a base station reception beam which is allocated to each unit time interval included in the beam-formed random access interval.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for supporting a beam-forming scheme by a base station in a wireless communication system, the method comprising:
   transmitting, to a user equipment (UE), a beam measurement reference signal (BMRS);
   transmitting information related to a first reception beam corresponding to a first unit time interval;
   performing a reception beam-sweeping process based on the first reception beam in the first unit time interval;
   identifying whether to perform the reception beam-sweeping process based on a second reception beam corresponding to a second unit time interval, wherein the reception beam-sweeping process based on the second reception beam is stopped in case that a packet is received in the first unit time interval from the UE, and wherein the reception beam-sweeping process based on the second reception beam is performed in case that the packet is not received in the first unit time interval from the UE, the packet indicating that the UE is scheduled to transmit a data packet based on the first reception beam; and
   performing a random access process with the UE.

2. A method for supporting a beam-forming scheme by a user equipment (UE) in a wireless communication system, the method comprising:
   receiving, from a base station, a beam measurement reference signal (BMRS);
   identifying an optimal beam, based on the BMRS;
   receiving, from the base station, information related to the optimal beam in a unit time interval corresponding to the optimal beam; and
   performing a random access process with the base station in the unit time interval corresponding to the optimal beam,
   wherein the optimal beam is among one or more reception beams which correspond to one or more unit time intervals respectively, and
   wherein information related to each of one or more reception beams is transmitted in a corresponding unit time interval among the one or more unit time intervals.

3. The method of claim 1, wherein the packet indicating that the UE is scheduled to transmit the data packet to the base station, further includes at least one of control information related to the random access process, a part of the data packet, or the data packet.

4. The method of claim 3,
   wherein the packet indicating that the UE is scheduled to transmit the data packet to the base station, is transmitted after preset random backoff time from a start timing of the unit time interval corresponding to an optimal beam, and
   wherein the preset random backoff time is randomly determined for each UE.

5. The method of claim 3,
   wherein the packet indicating that the UE is scheduled to transmit the data packet to the base station, is transmitted through a randomly selected resource, and
   wherein the randomly selected resource is defined with an index in a frequency axis and a time axis.

6. The method of claim 4, wherein the preset random backoff time is determined by considering time at which a packet indicating that the base station rejects the random access for the UE is transmitted and received.

7. The method of claim 4, further comprising:
   if receiving a packet requesting a random access after the random backoff time from the UE while the base station performs a random access process with another UE other than the UE, transmitting, to the UE, a response packet to the packet requesting the random access,
   wherein the response packet includes information indicating whether the base station permits the random access requested from the UE, and
   wherein a timing at which the another UE is capable of attempting a random access after random backoff time is after the base station transmits the response packet to the UE.

8. The method of claim 1, further comprising:
   restarting the stopped reception beam-sweeping process after completing the random access process with the UE.

9. The method of claim 1, wherein the information related to the first reception beam includes at least one of information related to a start timing and an end timing of a beam-formed random access interval, or information related to a base station reception beam which is allocated to each unit time interval.

10. The method of claim 7, wherein the information related to the base station reception beam includes: indexes allocated to a plurality of base station reception beams.

11. The method of claim 2, wherein the performing the random access process with the base station in the unit time interval corresponding to the optimal beam includes:
    transmitting to the base station, a packet indicating that the UE is scheduled to transmit a data packet to the base station based on the optimal beam.

12. The method of claim 11, wherein the packet indicating that the UE is scheduled to transmit the data packet to the base station, further includes at least one of control information related to the random access process, a part of the data packet, or the data packet.

13. The method of claim 12,
    wherein the packet indicating that the UE is scheduled to transmit the data packet to the base station, is transmitted after preset random backoff time from a start timing of the unit time interval corresponding to the optimal beam, and
    wherein the preset random backoff time is randomly determined for each UE.

14. The method of claim 13, further comprising:
    if transmitting a packet requesting a random access after the random backoff time from the base station while the base station performs a random access process with another UE other than the UE, receiving from the base station, a response packet to the packet requesting the random access,
    wherein the response packet includes information indicating whether the base station permits the random access requested from the UE, and
    wherein a timing at which the another UE is capable of attempting a random access after random backoff time is after the base station transmits the response packet to the UE.

15. The method of claim 12,
    wherein the packet indicating that the UE is scheduled to transmit the data packet to the base station, is transmitted through a randomly selected resource, and
    wherein the randomly selected resource is defined with an index in a frequency axis and a time axis.

16. The method of claim 13, wherein the preset random backoff time is determined by considering time at which a packet indicating that the base station rejects the random access for the UE is transmitted and received.

17. The method of claim 2, wherein the information related to the each of one or more reception beams includes: at least one of information related to a start timing and an end timing of a beam-formed random access interval, or information related to a base station reception beam which is allocated to each unit time interval.

18. A base station in a wireless communication system supporting a beam-forming scheme, the base station comprising:
    a transceiver; and
    a processor configured to:
       control the transceiver to transmit, to a user equipment (UE), a beam measurement reference signal (BMRS),
       control the transceiver to transmit information related to a first reception beam corresponding to a first unit time interval,
       perform a reception beam-sweeping process based on the first reception beam corresponding to the first unit time interval in the first unit time interval,
       identify whether to perform the reception beam-sweeping process based on a second reception beam corresponding to a second unit time interval, wherein the reception beam-sweeping process based on the second reception beam is stopped in case that a packet is received in the first unit time interval from the UE, and wherein the reception beam-sweeping process based on the second reception beam is performed in case that the packet is not received in the first unit time interval from the UE, the packet indicating that the UE is scheduled to transmit a data packet based on the first reception beam, and perform a random access process with the UE.

19. A user equipment (UE) in a wireless communication system supporting a beam-forming scheme, the UE comprising:

a transceiver; and a processor configured to:

control the transceiver to receive, from a base station, a beam measurement reference signal (BMRS), identify an optimal beam, based on the BMRS, control the transceiver to receive, from the base station, information related to the optimal beam in a unit time interval corresponding to the optimal beam, and perform a random access process with the base station in the unit time interval which corresponds to the optional corresponding to the optimal beam, wherein the optimal beam is among one or more reception beams which correspond to one or more unit time intervals respectively, and wherein information related to each of one or more reception beams is transmitted in a corresponding unit time interval among the one or more unit time intervals.

* * * * *